US010251197B2

(12) United States Patent
Yerramalli et al.

(10) Patent No.: US 10,251,197 B2
(45) Date of Patent: Apr. 2, 2019

(54) TRANSMITTING UPLINK CONTROL CHANNEL INFORMATION WHEN A CLEAR CHANNEL ASSESSMENT OF AN UNLICENSED CARRIER FAILS

(71) Applicant: QUALCOMM Incorporated, San Diego, CA (US)

(72) Inventors: Srinivas Yerramalli, San Diego, CA (US); Xiaoxia Zhang, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 176 days.

(21) Appl. No.: 15/198,713

(22) Filed: Jun. 30, 2016

(65) Prior Publication Data

US 2017/0027002 A1 Jan. 26, 2017

Related U.S. Application Data

(60) Provisional application No. 62/196,252, filed on Jul. 23, 2015.

(51) Int. Cl.
*H04W 74/08* (2009.01)
*H04L 5/00* (2006.01)
(Continued)

(52) U.S. Cl.
CPC ....... *H04W 74/0816* (2013.01); *H04L 5/0053* (2013.01); *H04W 74/004* (2013.01);
(Continued)

(58) Field of Classification Search
CPC ........... H04W 74/004; H04W 74/0808; H04W 74/0816; H04W 16/14; H04L 5/001; H04L 5/0053
See application file for complete search history.

(56) References Cited

U.S. PATENT DOCUMENTS

2004/0142696 A1* 7/2004 Saunders ............... H04B 1/715 455/450
2013/0034073 A1* 2/2013 Aiba ..................... H04L 1/0026 370/329

(Continued)

OTHER PUBLICATIONS

Alcatel-Lucent, et al., "Control Signaling for LAA", 3GPP Draft, R1-151074—Control Signaling for LAA—Final, 3rd Generation Partnership Project (3GPP), Mobile Competence Centre, 650, Route Des Lucioles, F-06921 Sophia-Antipolis Cedex, France, vol. RAN WG1, No. Paris, France, Mar. 24, 2015-Mar. 26, 2015, Mar. 18, 2015 (Mar. 18, 2015), 3 Pages, XP050951429, Retrieved from the Internet: URL: http://www.3gpp.org/ftp/tsg_ran/WG1_RL1/TSGR1_AH/LTE_LAA_1503/Docs/ [retrieved on Mar. 18, 2015].

(Continued)

*Primary Examiner* — Jenee Holland
(74) *Attorney, Agent, or Firm* — Nerrie M. Zohn

(57) ABSTRACT

Uplink control information may not be transmitted if a CCA of the unlicensed SCC fails. Thus, the present disclosure provide a solution in which uplink control information for an unlicensed SCC may still be transmitted when a CCA of the unlicensed SCC fails. In an aspect of the disclosure, a method, a computer-readable medium, and an apparatus are provided. The apparatus generates uplink control information. The apparatus also attempts to perform a CCA of a carrier for an uplink burst. In addition, the apparatus determines a failure of the CCA. In addition, the apparatus performs one of the following when it is determined that the CCA has failed: transmitting the PUCCH transmission on the carrier in a later subframe of the uplink burst, transmitting the PUCCH transmission on the carrier in a different uplink burst, or transmitting the PUCCH transmission on a different carrier.

32 Claims, 15 Drawing Sheets

400
402
414
410
404
412
406
408

(51) Int. Cl.
*H04W 74/00* (2009.01)
*H04W 16/14* (2009.01)

(52) U.S. Cl.
CPC ......... *H04W 74/0808* (2013.01); *H04L 5/001* (2013.01); *H04W 16/14* (2013.01)

(56) References Cited

U.S. PATENT DOCUMENTS

2014/0341018 A1* 11/2014 Bhushan ........... H04W 28/0289 370/230
2014/0362780 A1 12/2014 Malladi et al.
2015/0023315 A1* 1/2015 Yerramalli .......... H04W 74/002 370/330
2015/0043687 A1* 2/2015 Luo ........................ H04B 1/006 375/349
2015/0049708 A1* 2/2015 Damnjanovic ....... H04L 1/1812 370/329
2015/0049709 A1* 2/2015 Damnjanovic ....... H04L 5/0055 370/329
2015/0055589 A1* 2/2015 Yerramalli ............ H04L 1/1861 370/329
2015/0092702 A1 4/2015 Chen et al.
2015/0092703 A1* 4/2015 Xu .......................... H04L 5/003 370/329
2015/0103707 A1* 4/2015 Panta ................ H04W 52/0203 370/311
2015/0237548 A1* 8/2015 Luo ....................... H04L 5/0076 370/329
2017/0310422 A1* 10/2017 Baker ....................... H04L 1/18
2017/0311337 A1* 10/2017 Mo ....................... H04W 72/12

OTHER PUBLICATIONS

Catt: "Data and Control Signaling Transmission for LAA", 3GPP Draft, R1-151007, 3rd Generation Partnership Project (3GPP), Mobile Competence Centre, 650, Route Des Lucioles, F-06921 Sophia-Antipolis Cedex, France, vol. RAN WG1, No. Paris, France, Mar. 24, 2015-Mar. 26, 2015, Mar. 18, 2015 (Mar. 18, 2015), 3 Pages, XP050951385, Retrieved from the Internet: URL: http://www.3gpp.org/ftp/tsg_ran/WG1_RL1/TSGR1_AH/LTE_LAA_1503/Docs/ [retrieved on Mar. 18, 2015].
International Search Report and Written Opinion—PCT/US2016/040674—ISA/EPO—dated Oct. 10, 2016.

* cited by examiner

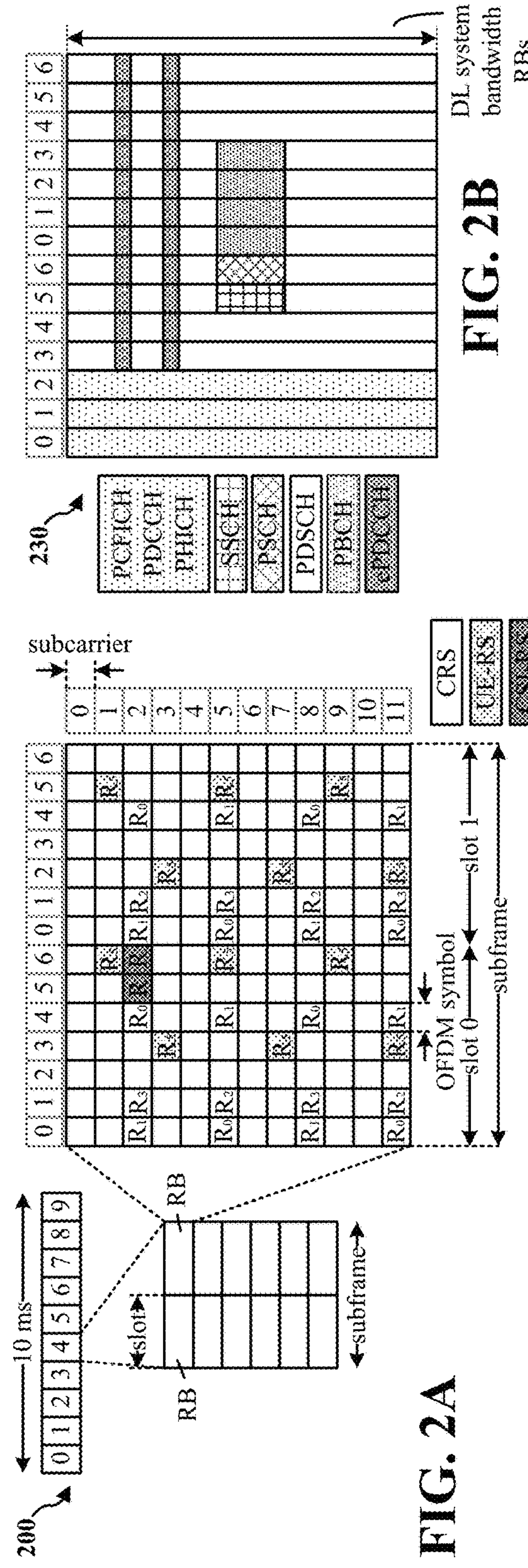
FIG. 2A
FIG. 2B
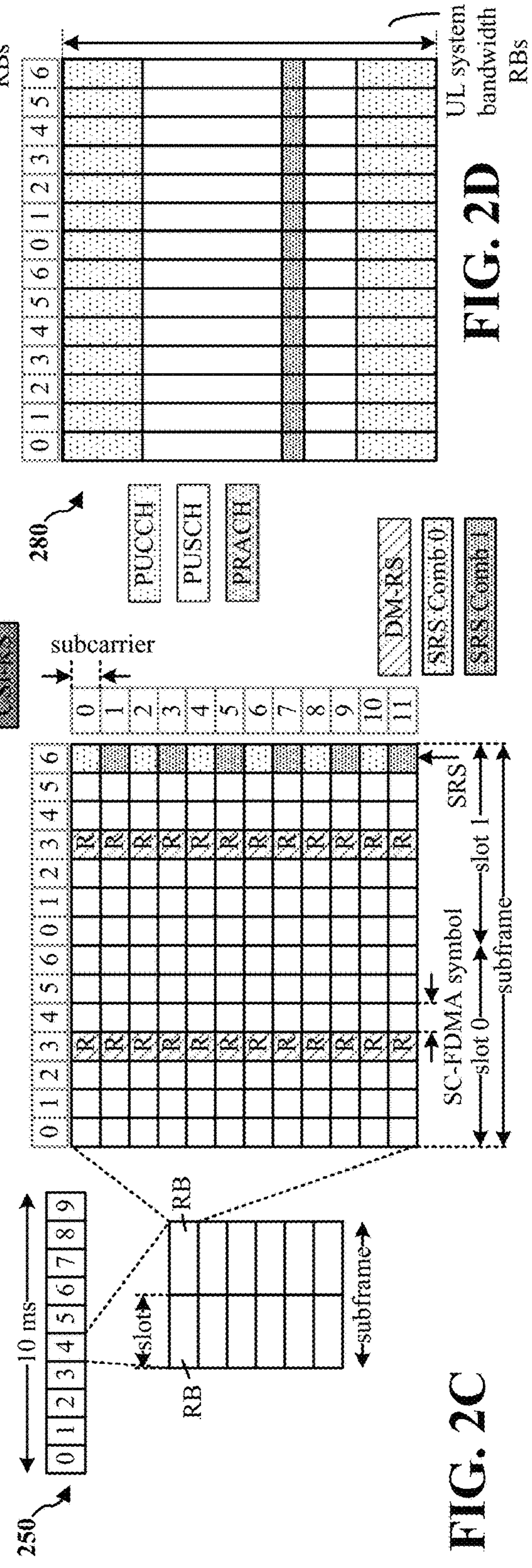
FIG. 2C
FIG. 2D

TRANSMITTING UPLINK CONTROL CHANNEL INFORMATION WHEN A CLEAR CHANNEL ASSESSMENT OF AN UNLICENSED CARRIER FAILS

CROSS-REFERENCE TO RELATED APPLICATION

This application claims the benefit of U.S. Provisional Application Ser. No. 62/196,252, entitled "TRANSMITTING UPLINK CONTROL CHANNEL INFORMATION WHEN A CLEAR CHANNEL ASSESSMENT OF AN UNLICENSED CARRIER FAILS" and filed on Jul. 23, 2015, which is expressly incorporated by reference herein in its entirety.

BACKGROUND

Field

The present disclosure relates generally to communication systems, and more particularly, to transmitting uplink control information (e.g., a physical uplink control channel (PUCCH) transmission) when a clear channel assessment (CCA) of an unlicensed carrier fails.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

In license assisted access (LAA), an unlicensed carrier (e.g., secondary component carrier (SCC)) may be aggregated with a licensed carrier (e.g., primary component carrier (PCC)). Because a PUCCH transmission for the unlicensed SCC may be subject to listen-before-talk (LBT) procedures, the PUCCH transmission may not be transmitted if a CCA of the unlicensed SCC fails.

When the PUCCH transmission is not transmitted by a user equipment (UE) various problems may arise. For example, acknowledgement (ACK)/negative acknowledgement (NACK) feedback may not be available at the evolved Node B (eNB), hybrid automatic repeat request (HARQ) processes may be suspended or terminated, the eNB may use outdated CSI for scheduling, and/or the contention window size that the eNB uses for the next transmission may be impacted because a CCA failure for a PUCCH transmission on the unlicensed SCC may increase the contention window size.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In LAA, an unlicensed carrier (e.g., the SCC) may be aggregated with a licensed carrier (e.g., the PCC). Conventionally, through carrier aggregation in LAA, the licensed PCC may act as an anchor, carrying the control information and signaling information in the PUCCH. Supporting PUCCH transmissions in the unlicensed SCC via enhanced PUCCH (ePUCCH) may have various benefits, such as reducing the overhead of the PCC.

Because the capacity of the ePUCCH in the unlicensed SCC may be larger than the capacity of the PUCCH in the licensed PCC, the payload of a PUCCH transmission in the ePUCCH of the unlicensed SCC may be larger than the payload of a PUCCH transmission in the PUCCH of the licensed PCC. Therefore, a PUCCH transmission on multiple LAA carriers may include a payload that is split across multiple carriers (e.g., the PCC and SCC). However, since a PUCCH transmission that is intended for the unlicensed SCC may be subject to LBT procedures, the PUCCH transmission may not be transmitted if a CCA of the unlicensed SCC fails.

When the PUCCH transmission is not transmitted by the UE various problems may arise. For example, ACK/NACK feedback may not be available at the eNB, HARQ processes may be suspended or terminated, the eNB may use outdated CSI for scheduling, and/or the contention window size that the eNB uses for the next transmission may be impacted because a CCA failure for a PUCCH transmission on the unlicensed SCC may increase the contention window size.

The present disclosure provides a solution to the problem by enabling the transmission of a PUCCH transmission on the unlicensed SCC when a CCA of the unlicensed SCC fails. In addition, an aspect of the present disclosure may also provide enhancements when CCA clears on the unlicensed SCC.

In an aspect of the disclosure, a method, a computer-readable medium, and an apparatus are provided. The apparatus generates uplink control information. The apparatus attempts to perform a CCA of a carrier for an uplink burst. In addition, the apparatus determines a failure of the CCA. Still further, the apparatus performs one of the following when it is determined that the CCA has failed: transmitting the PUCCH transmission on the carrier in a later subframe of the uplink burst, transmitting the PUCCH transmission on the carrier in a different uplink burst, or transmitting the PUCCH transmission on a different carrier.

In another aspect, the apparatus generates first uplink control channel transmission for transmission on a first carrier. In addition, the apparatus attempts to perform a CCA of a carrier. The apparatus also determines if the CCA of the carrier clears. Still further, the apparatus transmits all or at least a portion of a payload of the first uplink control channel transmission in an uplink control channel on a second carrier. In an aspect, when at least the portion of the payload of the first uplink control transmission is transmitted on the second carrier, second uplink control transmission is transmitted on the first carrier.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating LTE examples of a DL frame structure, DL channels within the DL frame structure, an UL frame structure, and UL channels within the UL frame structure, respectively.

DETAILED DESCRIPTION

Figure 1:
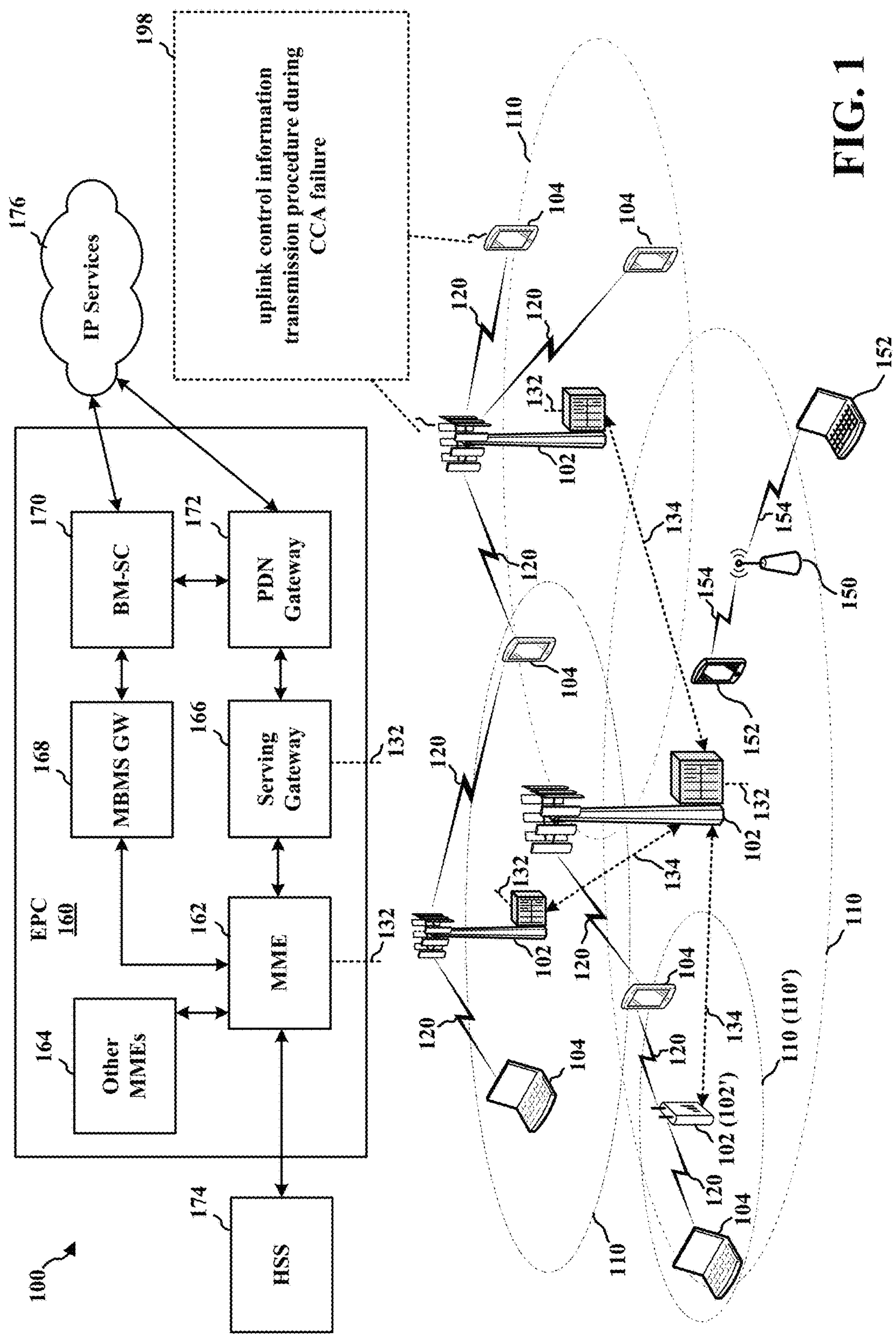
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions:

transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), LAA, or MuLTEfire.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to perform an uplink control information transmission procedure during CCA failure.

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
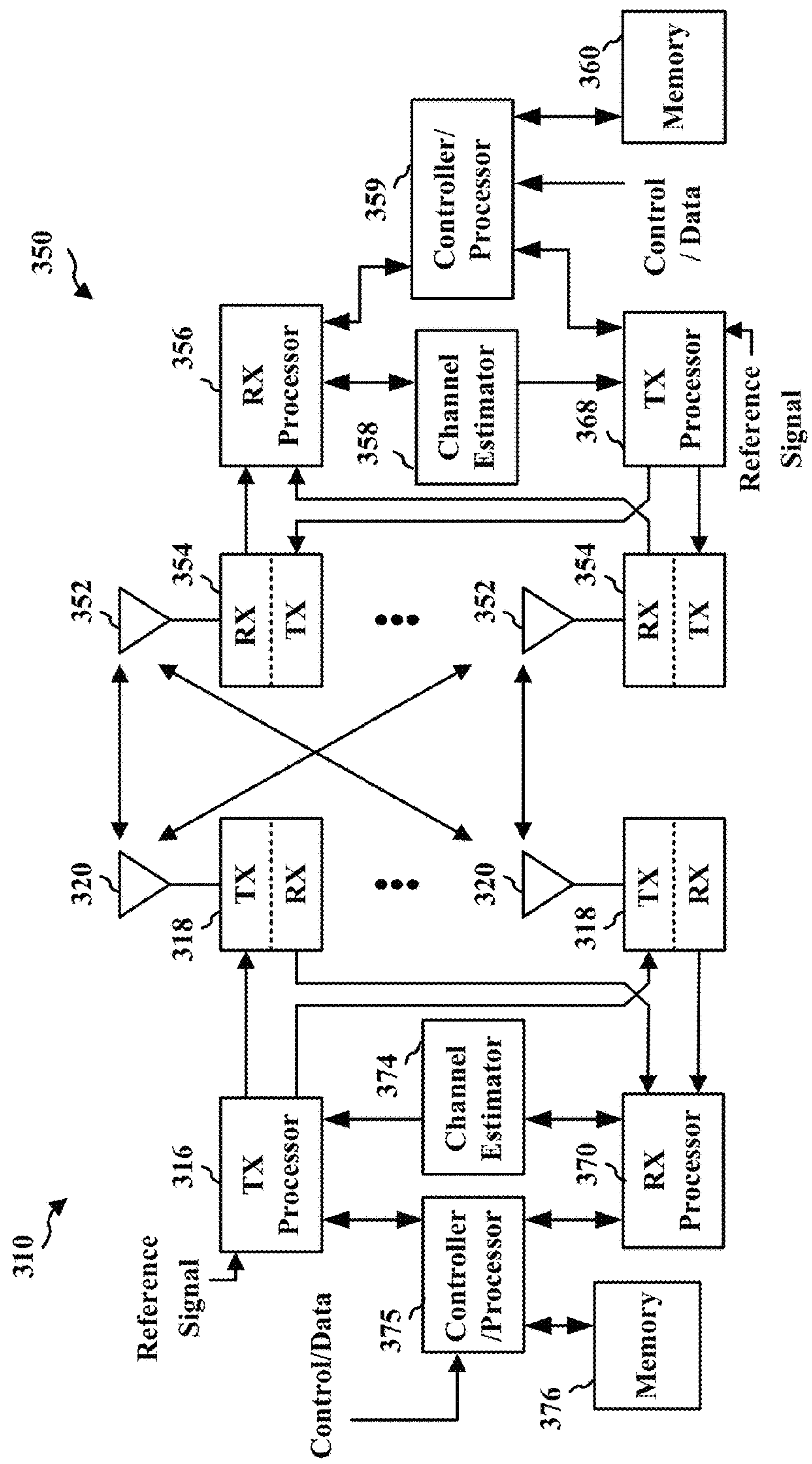
FIG. 3 is a diagram illustrating an example of an eNB and UE in an access network.

FIG. 3 is a block diagram of an eNB 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demuliplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demuliplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

In LAA, an unlicensed carrier (e.g., the SCC) may be aggregated with a licensed carrier (e.g., the PCC). Conventionally, through carrier aggregation in LAA, the licensed PCC may act as an anchor, carrying the control information and signaling information in the PUCCH. Supporting PUCCH transmissions in the unlicensed SCC via the ePUCCH may have various benefits, such as reducing the overhead of the PCC.

Because the capacity of the ePUCCH in the unlicensed SCC may be larger than the capacity of the PUCCH in the licensed PCC, the payload of a PUCCH transmission in the ePUCCH of the unlicensed SCC may be larger than the payload of a PUCCH transmission in the PUCCH of the licensed PCC. Therefore, a PUCCH transmission on multiple LAA carriers may include a payload that is split across multiple carriers (e.g., the PCC and SCC). However, since a PUCCH transmission that is intended for the unlicensed SCC may be subject to LBT procedures, the PUCCH transmission may not be transmitted if a CCA of the unlicensed SCC fails.

When the PUCCH transmission is not transmitted by the UE various problems may arise. For example, ACK/NACK feedback may not be available at the eNB, HARQ processes may be suspended or terminated, the eNB may use outdated CSI for scheduling, and/or the contention window size that the eNB uses for the next transmission may be impacted because a CCA failure for a PUCCH transmission on the unlicensed SCC may increase the contention window size.

The present disclosure provides a solution to the problem by enabling the transmission of a PUCCH transmission on the unlicensed SCC when a CCA of the unlicensed SCC fails. In addition, an aspect of the present disclosure may also provide enhancements when CCA clears on the unlicensed SCC.

Figure 4:
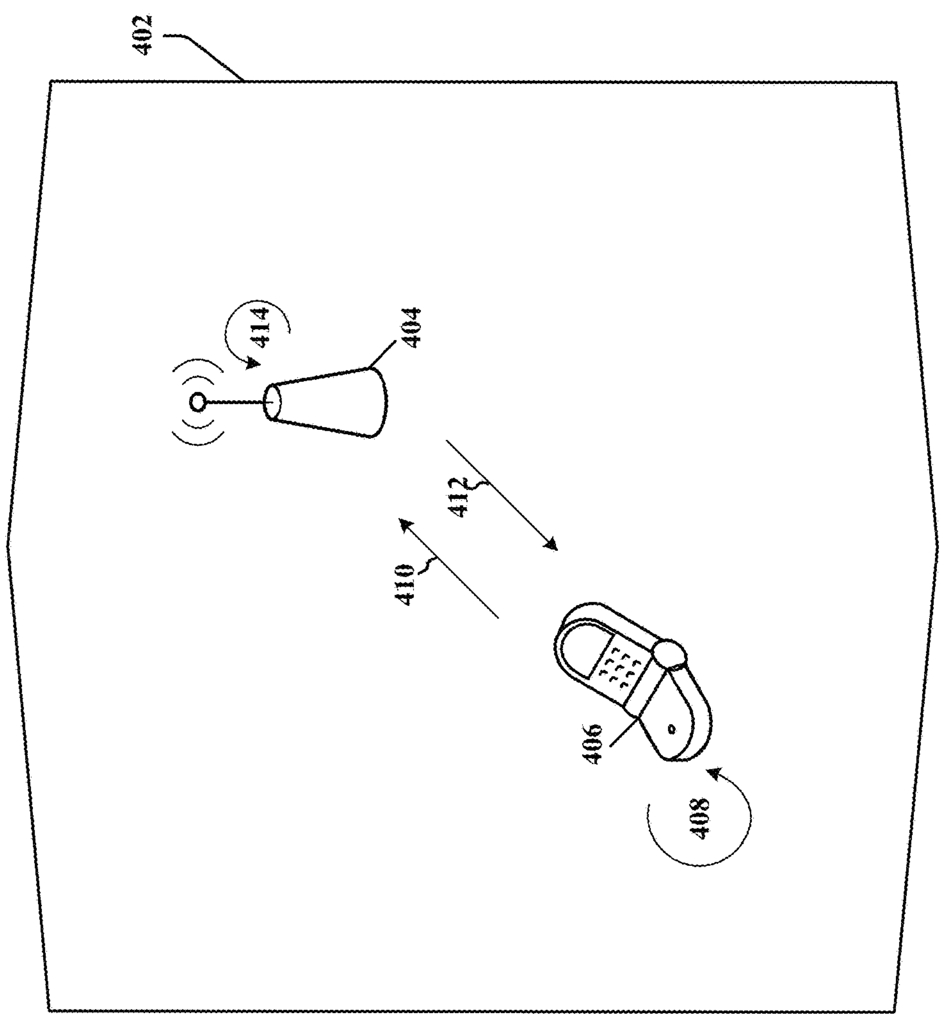
FIG. 4 is a diagram illustrating an example wireless communications system in accordance with an aspect of the present disclosure.

FIG. 4 is a diagram of an example wireless communications system 400 in accordance with one aspect of the disclosure. For example, the wireless communications system 400 may include a serving cell 402 that is in the region served by an eNB 404. In addition, a UE 406 located in the serving cell 402 may be in communication with the eNB 406.

In an aspect, the eNB 404 may employ at least one licensed carrier and at least one unlicensed carrier for communication with UEs served by serving cell 402. For example, the licensed carrier may be a PCC and the unlicensed carrier may be an SCC. The UE 406 may perform various processes for transmitting a PUCCH transmission (e.g., uplink control information) to the eNB 404 if an attempt to perform a CCA of the original unlicensed carrier fails. In an aspect, to ensure the transmission of the PUCCH transmission even if an initial CCA of the original unlicensed carrier fails, the eNB 404 may reserve 414 PUCCH resources in one or more subframes of each uplink burst of various unlicensed carriers for the PUCCH transmission. Information associated with the reserved PUCCH resources may be signaled 412 to the UE 406 by the eNB 404.

In another aspect, the UE 406 may generate 408 a PUCCH transmission to be sent on the original unlicensed carrier (e.g., during an uplink burst) to eNB 404. In addition, the UE 406 may attempt 408 to perform a CCA of the unlicensed carrier. Further still, the UE 406 may determine 408 if the CCA of the original unlicensed carrier fails or clears. If the CCA of the original unlicensed carrier clears, the UE 406 may transmit 410 the PUCCH transmission in an original subframe of an uplink burst on the original unlicensed carrier.

If the CCA of the original unlicensed carrier fails, the UE 406 may perform one of the following: 1) transmit 410 the PUCCH transmission on the original unlicensed carrier in a later subframe of the uplink burst, 2) transmit 410 the PUCCH transmission on the original unlicensed carrier in a different uplink burst, 3) transmit 410 the PUCCH transmission on a different unlicensed carrier and/or on a licensed carrier, 4) multiplex 408 the PUCCH transmission with the current/next/later PUCCH instance on the licensed carrier, 5) multiplex 408 the PUCCH transmission with the PUSCH on the licensed carrier, or 6) split/compress 408 the payload of the PUCCH to be transmitted across the licensed carrier and the original unlicensed carrier or different unlicensed carrier.

In a first example, when the CCA of the original unlicensed carrier fails, the UE 406 may attempt to transmit the PUCCH transmission on the next subframe or later subsequent subframes reserved for PUCCH transmissions by the eNB 404. Prior to transmission, the UE 406 may perform 408 another CCA check of the original unlicensed carrier on the later subframe. If this CCA check clears, the PUCCH transmission may be sent 410 on the original unlicensed carrier in the later subframe of the uplink burst. If necessary, the UE 406 may update 408 the payload of the PUCCH transmission prior to transmission.

In addition, the UE 406 may determine 408 the reserved PUCCH resources in a later subframe of the uplink burst based on the signaling 412 received from the eNB 404. For example, the signaling 412 may include RRC signaling or DCI signaling. Alternatively, the UE 460 may be able to infer the location of the next PUCCH subframe based on information included in the physical control format indicator channel (PCFICH).

In a further aspect, the PUCCH transmission may include cyclic redundancy check (CRC) bits. The eNB 404 may be able to blindly detect in which subframe and uplink burst the UE 406 has sent the PUCCH transmission by checking for the CRC scrambled by a radio network temporary identifier (RNTI). For example, the eNB 404 may check for the CRC scrambled by the RNTI on the possible locations in the unlicensed spectrum and/or based on preamble detection.

In a second example, when the CCA of the original unlicensed carrier fails, the UE 406 may perform 408 another CCA check of the original unlicensed carrier, and if this CCA check clears the PUCCH transmission may be sent on the original unlicensed carrier in the later uplink burst. If necessary, the UE 406 may update 408 the payload of the PUCCH transmission before being sent on the original unlicensed carrier in the later uplink burst. As mentioned supra, information associated with the resources reserved in the later uplink burst may be signaled 412 to the UE 460 by the eNB 404.

In a third example, when the CCA of the original unlicensed carrier fails, the UE 406 may determine 408 the reserved PUCCH resources on each of the one or more different carriers based on the signaling 412 received from the eNB 404, and attempt to send the PUCCH transmission on at least one of the one or more different carriers.

Prior to transmission, the UE 406 may perform 408 a new CCA check of each of the one or more different carriers in the second example and/or the third example. If one of the new CCA checks clears, the PUCCH transmission may be dynamically sent 410 on a different carrier in the same uplink burst or in a different uplink burst on the original unlicensed carrier. In an aspect, the one or more different carriers may be different unlicensed carriers and/or licensed carriers. Furthermore, the PUCCH resources reserved on each of the one or more different carriers may be the same set of PUCCH resources or a different set of PUCCH resources than those reserved in the original unlicensed carrier.

In a first aspect of the second example and/or third example, if two or more of the new CCA checks clear, for example, then the different carrier selected for the PUCCH transmission may be chosen based on a priority list of the one or more different carriers. For example, the priority list may be transmitted by the signaling 412 from the eNB 404. In addition, the different carriers in the priority list may each be associated with a specific cell index.

In a second aspect of the second example and/or third example, the UE 406 may multiplex the PUCCH transmission with a PUSCH transmission in the same subframe or a later subframe on the different carrier selected for transmission.

In a third aspect of the second example and/or third example, the UE 406 may determine 408 if a number of failures of the CCA check of the original unlicensed carrier reaches a threshold value. If the number of failures of the CCA check reaches the threshold value, the PUCCH transmission may be sent 410 on one of the different carriers (e.g., a licensed carrier).

In a fourth aspect of the second example and/or third example, the different carrier selected by the UE 406 for sending the PUCCH transmission may be a licensed carrier. For example, the eNB 404 may reserve resources on a licensed carrier for ePUCCH fallback in case the CCA of the original unlicensed carrier fails. The transmission of the ePUCCH fallback may be on the licensed carrier PUCCH or PUSCH depending on the situation. For example, the UE 406 may determine 408 if a number of RBs in a PUSCH of the licensed carrier exceeds a threshold number. If the threshold number of RBs is exceeded, the UE 406 may multiplex 408 the PUCCH transmission with a licensed carrier PUSCH transmission. Otherwise, if the threshold number of RBs is not exceeded, the UE 406 may multiplex 408 the PUCCH transmission with a PUCCH transmission on the licensed carrier. In an aspect, the eNB 404 may vary the number of PUCCH resources reserved on the licensed carrier depending on the probability of CCA clearance at the UE 406.

Furthermore, the eNB 404 may check for fallback of the ePUCCH transmission x ms after original subframe on which the PUCCH transmission is scheduled in the original unlicensed carrier. By checking from fallback of the ePUCCH transmission k ms after the original subframe, the eNB 404 may have sufficient time to check if the CCA of the unlicensed carrier failed at UE 406 based on preamble detection. In an aspect, x may be a non-zero value. Alternatively, x may be set to 0 ms if the UE 406 has the PUCCH transmission ready for transmission on the unlicensed carrier and the licensed carrier ready before the failure of the CCA of the unlicensed carrier.

In addition, the UE 406 may reduce 408 a payload of the ePUCCH transmission when the ePUCCH transmission is sent on a licensed carrier. For example, the UE 406 may reduce 408 the payload of the ePUCCH transmission on the licensed carrier by: 1) reporting only ACK/NACK but dropping the CQI in the ePUCCH transmission on the licensed carrier, 2) reporting wideband CQI but dropping sub-band specific CQI in the ePUCCH transmission on the licensed carrier, 3) dropping a bursty interference indication, and/or 4) bundling some ACK/NACK bits and wideband CQI in the ePUCCH transmission on the licensed carrier. The mechanism by which the UE 406 reduces 408 the payload of the ePUCCH transmission on the licensed carrier may depend on configuration by the eNB 404.

For at least the reasons discussed supra, the present disclosure enables the transmission of uplink control information (e.g., a PUCCH transmission) when the CCA check fails. By enabling transmission of uplink control information when the CCA check fails, ACK/NACK feedback may be available at eNB 404, HARQ processes may not be suspended or terminated due to the failure of a CCA, the eNB 404 may avoid using outdated CSI for scheduling, and/or the contention window size that the eNB uses for next transmission may not be impacted.

Figure 5:
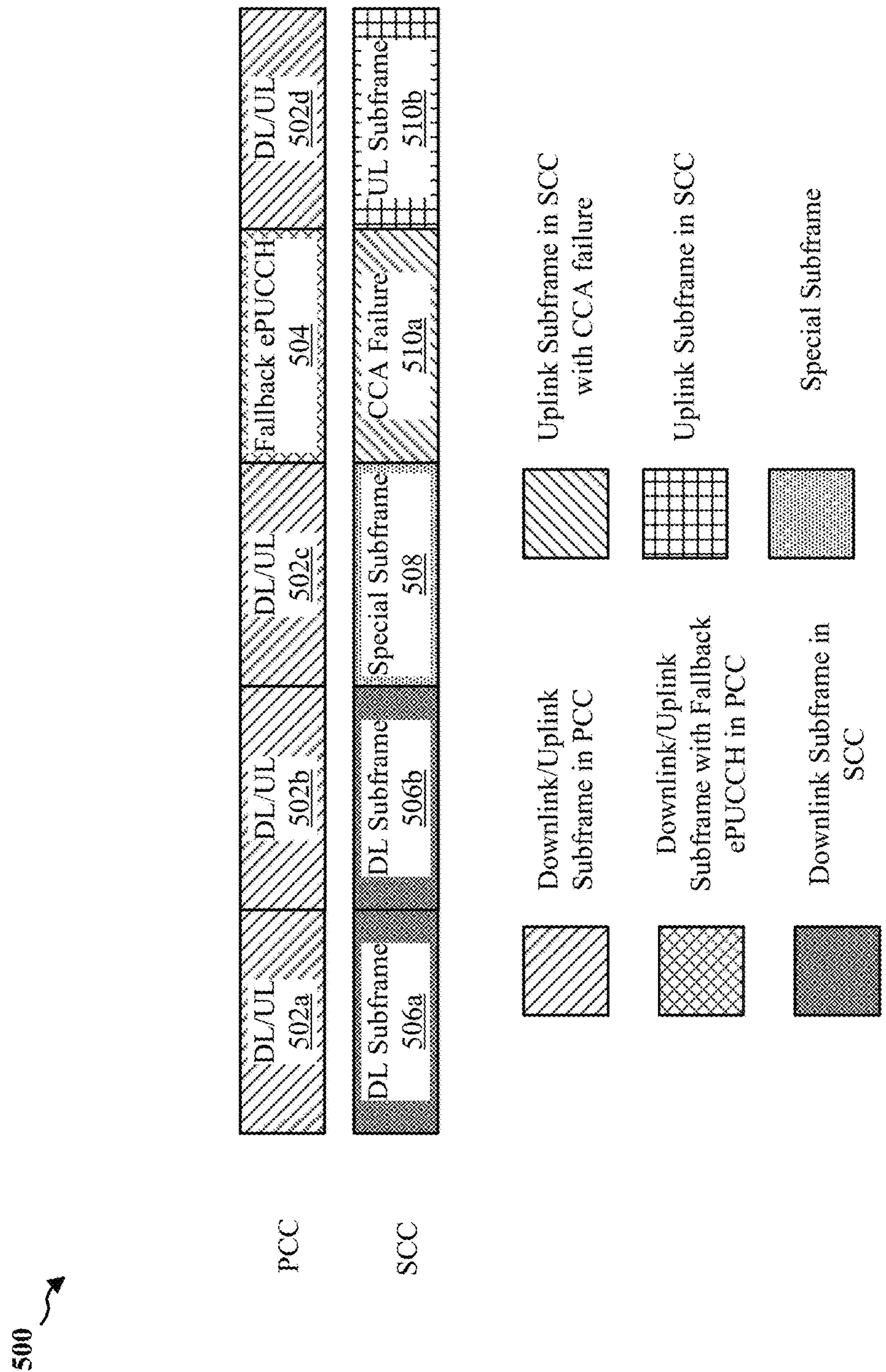
FIG. 5 is a diagram illustrating an example of subframes in a licensed carrier and an unlicensed carrier used in a fallback procedure in accordance with an aspect of the present disclosure.

FIG. 5 illustrates an example of subframes in a licensed carrier and an unlicensed carrier used in an ePUCCH fallback procedure when the CCA of the unlicensed carrier fails.

As illustrated in FIG. 5, the licensed carrier (e.g., PCC) includes DL/UL subframes 502*a*, 502*b*, 502*c*, 502*d*, 504 configured to enable communication between the eNB 404 and UE 406. As further illustrated in FIG. 5, the unlicensed carrier (e.g., SCC) includes a sequence of downlink subframes 506*a*, 506*b* on which the UE 406 may receive data and/or information from the eNB 404, a special subframe 508 in which the UE 406 may begin a CCA procedure, and a sequence of uplink subframes 510*a*, 510*b* in which the PUCCH transmission (e.g., ePUCCH transmission) may be sent if the CCA clears.

In the example illustrated in FIG. 5, the CCA check of the unlicensed carrier fails, and thus the UE 406 uses the ePUCCH fallback procedure to send the ePUCCH on the licensed carrier. In an example, the UE 406 may be configured with different reporting modes K (e.g., K=0, 1, 2, 3, or 4) on the unlicensed carrier and the licensed.

In an aspect, the UE may be configured with mode 2-2 if the ePUCCH is sent on the unlicensed carrier, but with mode 1-1 if the ePUCCH falls back to the licensed carrier. For example, referring to FIG. 4, the UE 406 may include ACK/NACK bits and CSI in the ePUCCH sent on the unlicensed carrier, but only include the ACK/NACK bits on the fallback ePUCCH sent on the licensed carrier.

Referring now to FIG. 4, if an attempt 408 to perform a CCA check of the original unlicensed carrier is successful, and the UE 406 determines the CCA of the original unlicensed carrier clears, the UE 406 may still have to transmit 410, 414 all or at least a portion of the payload PUCCH transmission in an uplink control channel on a different carrier, such as a licensed carrier. To reduce the payload of the ePUCCH transmitted on the licensed carrier, the UE 406 may transmit a portion of the ePUCCH on the unlicensed carrier as well as the licensed carrier. An ACK/NACK payload on the PUCCH of the licensed carrier may be multiplexed/bundled, and an ACK/NACK payload transmitted on ePUCCH/evolved PUSCH (ePUSCH) of an unlicensed carrier, individual bits may be transmitted without multiplexing/bundling.

In an example, a first portion of the payload of the PUCCH transmission may be transmitted 410 on the original unlicensed carrier and a second portion of the PUCCH transmission may be transmitted 410 on the licensed carrier. Since the capacity of the ePUCCH in the unlicensed SCC may be larger than the capacity of the PUCCH in the licensed PCC, the payload of a PUCCH transmission in the ePUCCH of the unlicensed SCC may generally be larger than the payload of a PUCCH transmission in the PUCCH of the licensed PCC. Consequently, the wireless communications system 400 of the present disclosure may be able to take advantage of opportunistic PUCCH transmission across LAA carriers by splitting payload across multiple carriers such as the PCC and SCC. Accordingly, a larger payload of the PUCCH transmission may be sent on the original unlicensed carrier (e.g., subband CQI) and a smaller payload of PUCCH transmission may be sent on the licensed carrier (e.g., wideband CQI). This allows the UE to feedback the anchor information with PUCCH transmission on the licensed carrier while allowing the UE to enhance the UL feedback information on the unlicensed carrier when it does check out CCA and is able to transmit control information on the unlicensed carrier.

Still referring to FIG. 4, the eNB 404 may determine the PUCCH payload size and content by attempting to blindly decode a few known payload sizes on the unlicensed carrier where CRC is present for verification by the eNB 404. In an aspect, a few bits may be added to the ePUCCH payload (e.g., like a header) by the UE 406 to indicate the format of the PUCCH content on the licensed carrier.

Figure 6A:
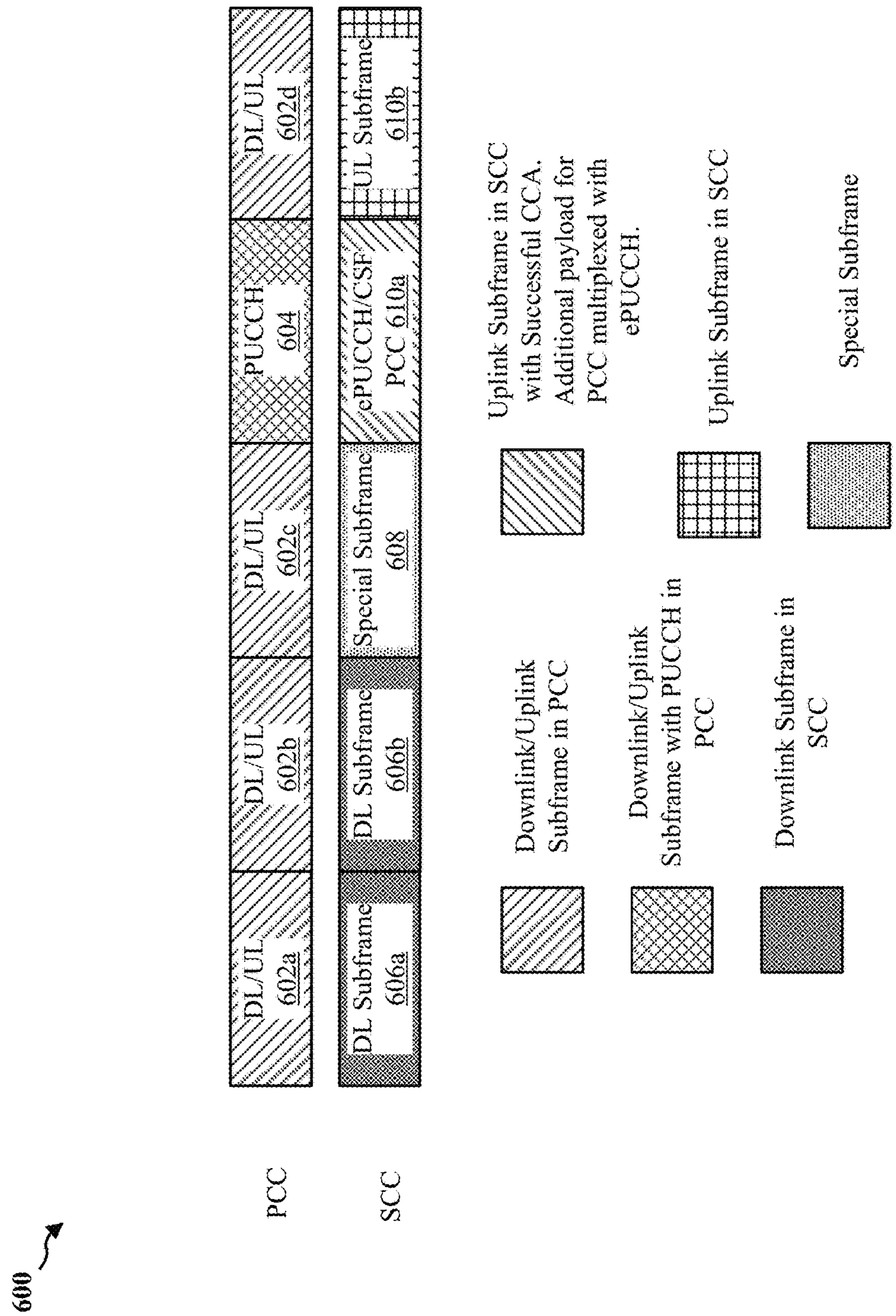
FIGS. 6A and 6B are diagrams illustrating illustrate example of load balancing between a licensed carrier and an unlicensed carrier in accordance with an aspect of the disclosure.
Figure 6B:
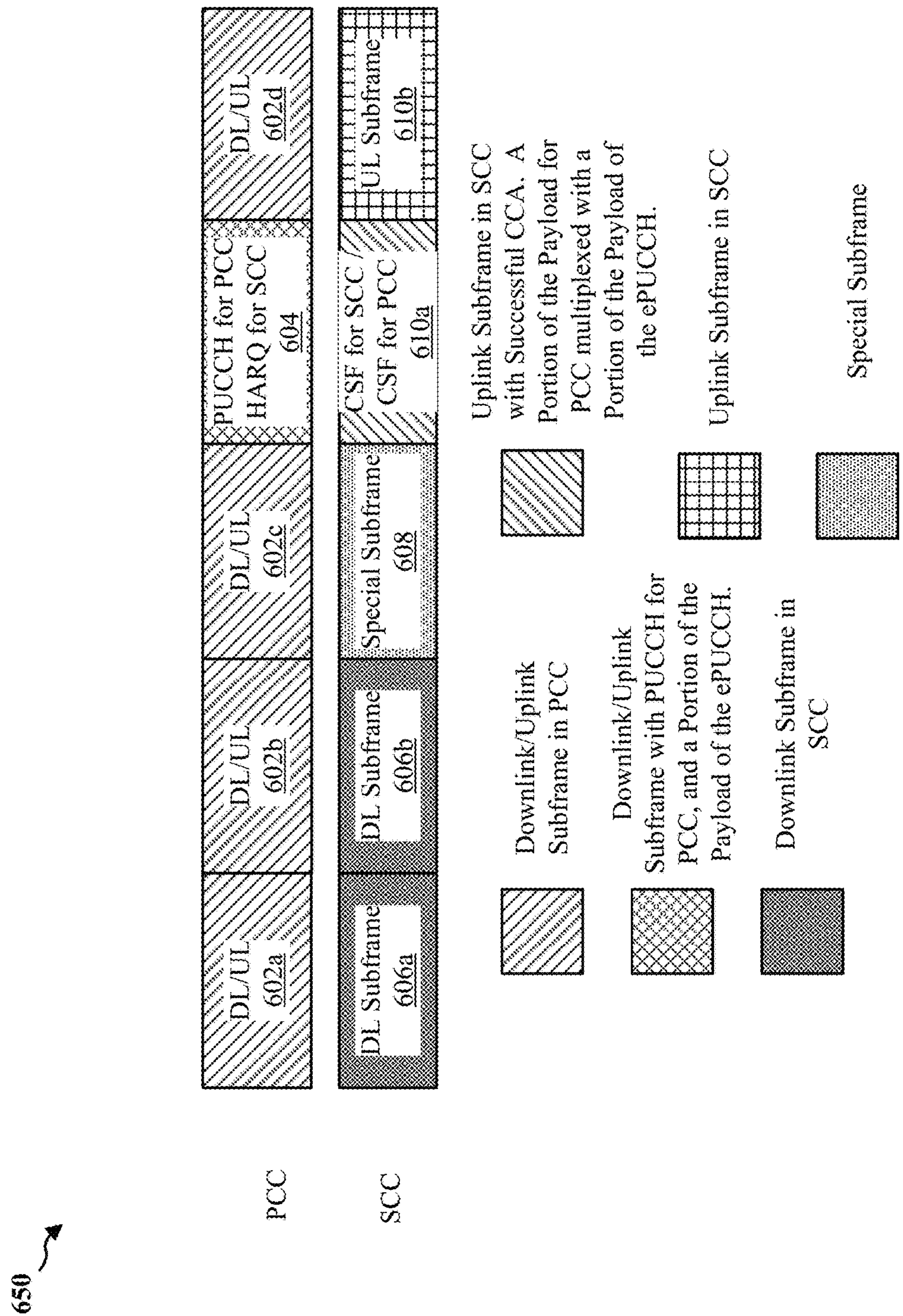

FIGS. 6A and 6B illustrate examples of load balancing 600, 650 between a licensed carrier (e.g., PCC) and an unlicensed carrier (e.g., SCC) when a CCA of the unlicensed carrier clears. As illustrated in FIGS. 6A and 6B, the licensed carrier (e.g., PCC) includes DL/UL subframes 602*a*, 602*b*, 602*c*, 602*d*, 604 configured to enable communication between the eNB 404 and UE 406.

In FIG. 6A, the unlicensed carrier (e.g., SCC) includes a sequence of downlink subframes 606*a*, 606*b* on which the UE 406 may receive data and/or information from the eNB 404, a special subframe 608 in which the UE 406 may start performing a CCA, and a sequence of uplink subframes 610*a*, 610*b* in which the ePUCCH transmission may be sent if the CCA clears. In the example illustrated in FIG. 6A, the CCA check of the unlicensed carrier clears, and the UE 406 sends the ePUCCH on the unlicensed carrier along with additional PCC information (e.g., channel state feedback (CSF)).

In FIG. 6B, the CCA check of the unlicensed carrier clears. In addition, the UE 406 sends the ePUCCH multiplexed with a CSF of the PCC on the unlicensed carrier, and the PUCCH multiplex with HARQ information on the licensed carrier. Since the capacity of the ePUCCH in the unlicensed SCC may be larger than the capacity of the PUCCH in the licensed PCC, the payload of a PUCCH transmission in the ePUCCH of the unlicensed SCC may generally be larger than the payload of a PUCCH transmission in the PUCCH of the licensed PCC. Consequently, the wireless communications system 400 of present disclosure may be able to take advantage of opportunistic PUCCH transmission across LAA carriers including splitting payload across multiple carriers such as the PCC and SCC.

FIGS. 7A-7E are a flowchart 700 of a method of wireless communication. The method may be performed by a UE (e.g., the UE 406, the apparatus 902/902'). Operations indicated with dashed lines represent optional operations for various aspects of the disclosure.

At 702, the UE may generate uplink control information. For example, referring to FIG. 4, the UE 406 may generate 408 a PUCCH transmission to be sent on the original unlicensed carrier during an uplink burst to eNB 404.

At 704, the UE may attempt to perform a CCA of a carrier for an uplink burst. For example, referring to FIG. 4, the UE 406 may attempt 408 to perform a CCA of the unlicensed carrier.

At 706, the UE may determine if the CCA fails. For example, referring to FIG. 4, the UE 406 may determine 408 if the CCA of the original unlicensed carrier fails or clears.

If the UE determines the CCA does not fail at 706, at 708, the UE may transmit the uplink control information on the carrier in the uplink burst. For example, referring to FIG. 4, if the CCA of the original unlicensed carrier clears, the UE 406 may transmit 410 the PUCCH transmission in an original subframe during uplink burst on the original unlicensed carrier.

Figure 7A:
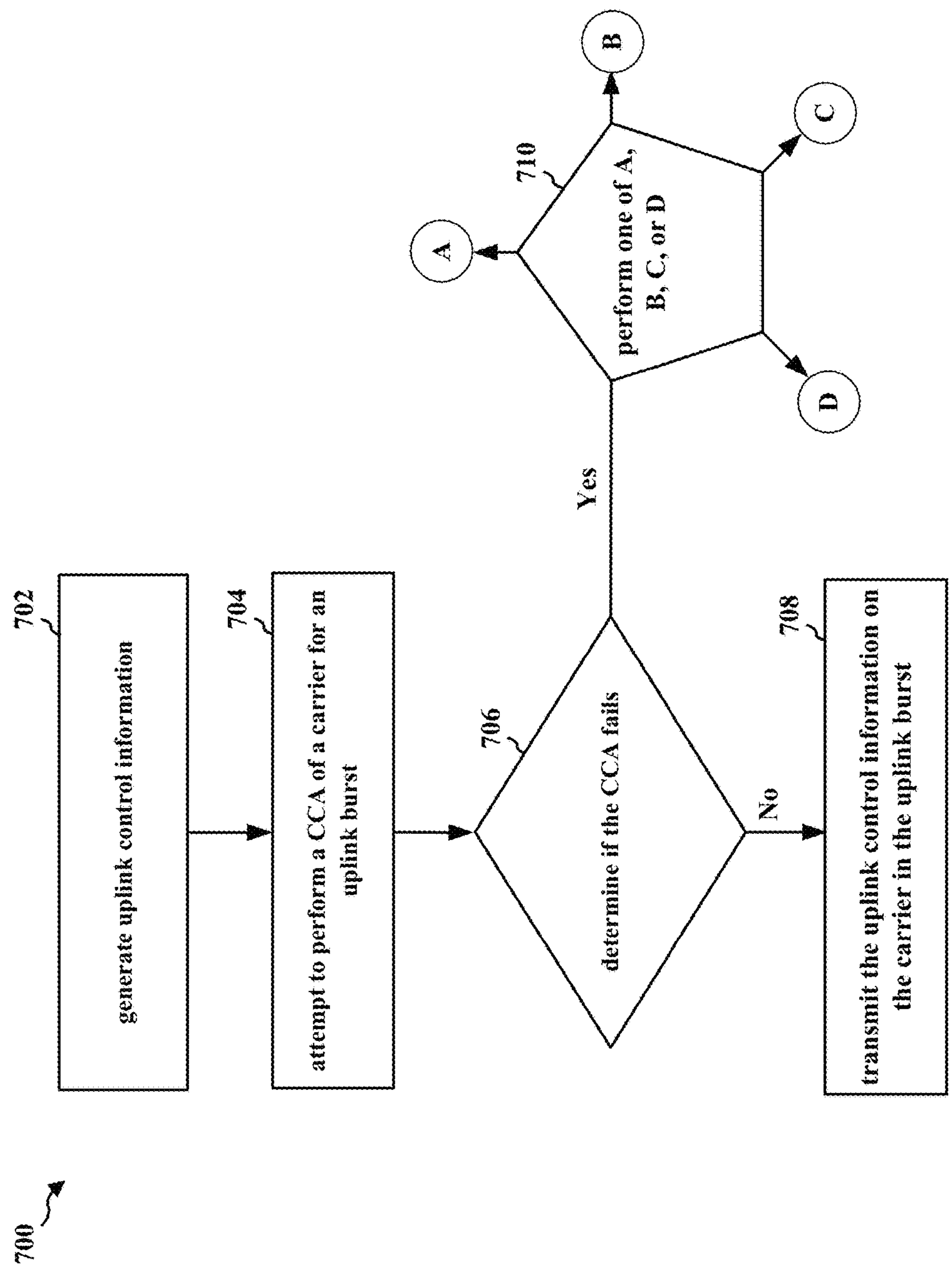
FIGS. 7A-7E are a flowchart of an example method of wireless communication.
Figure 7B:
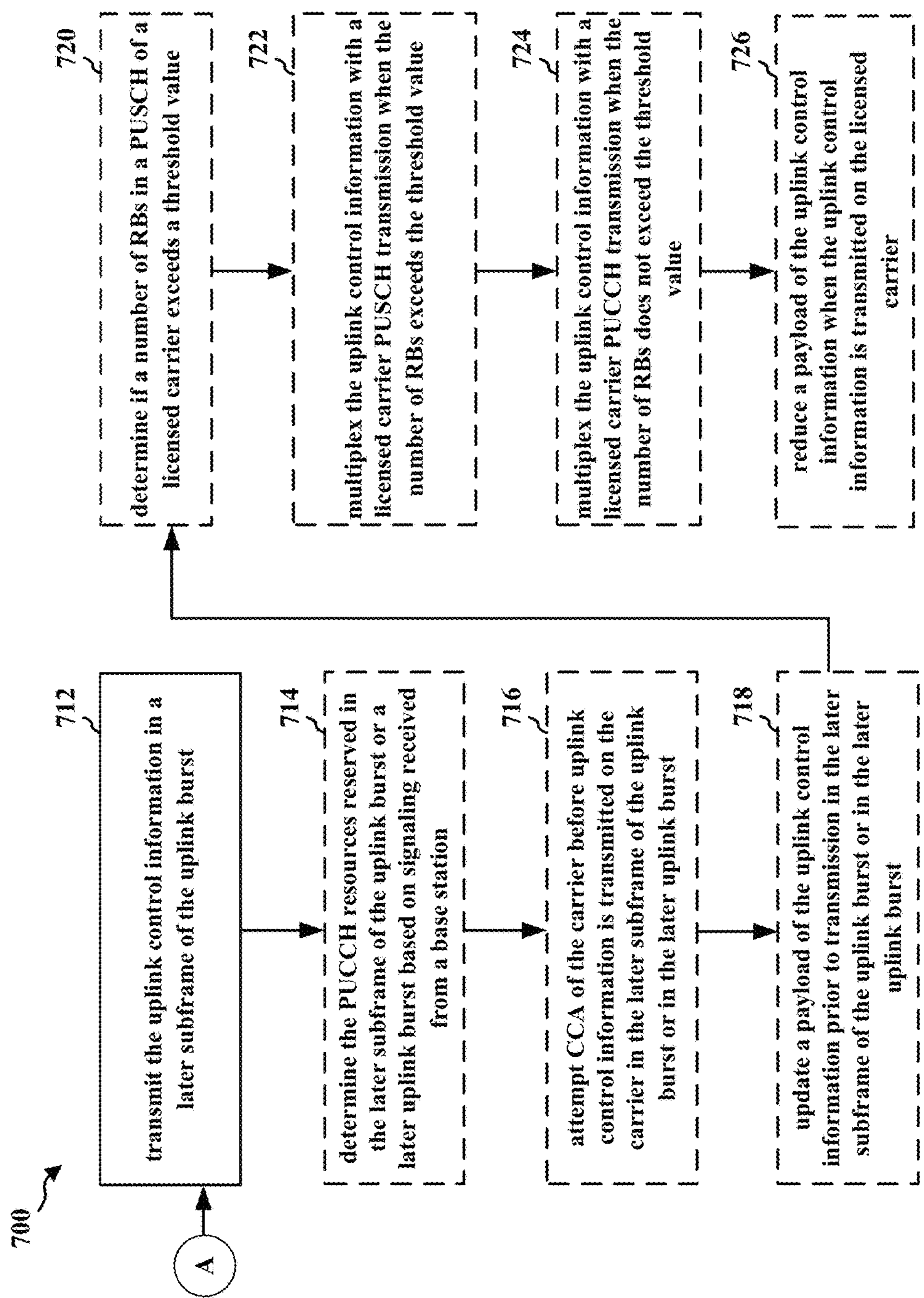
Figure 7C:
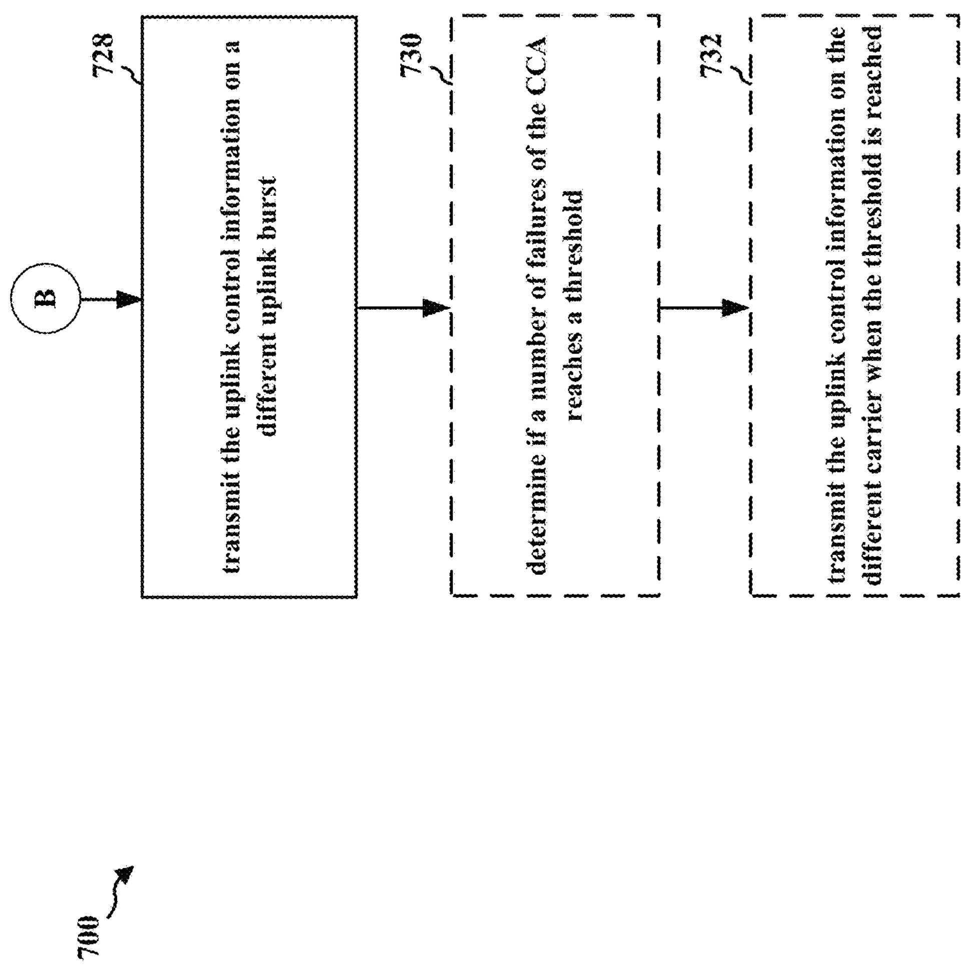
Figure 7D:
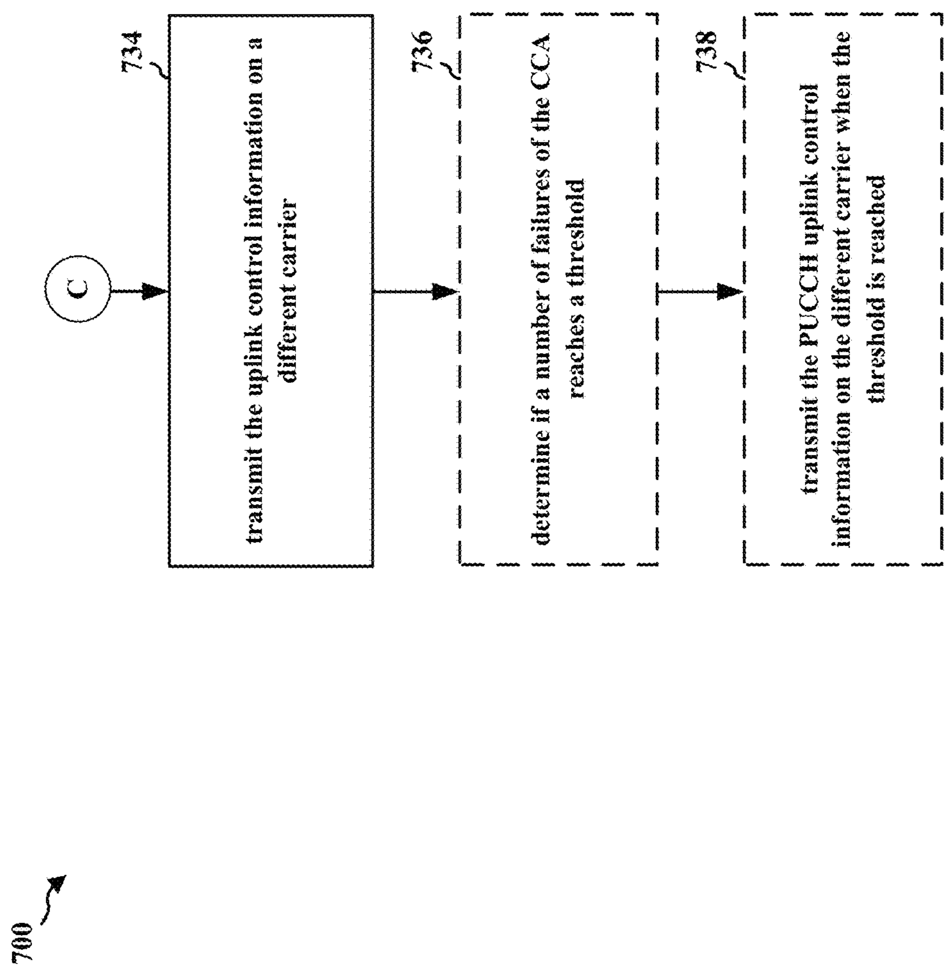
Figure 7E:
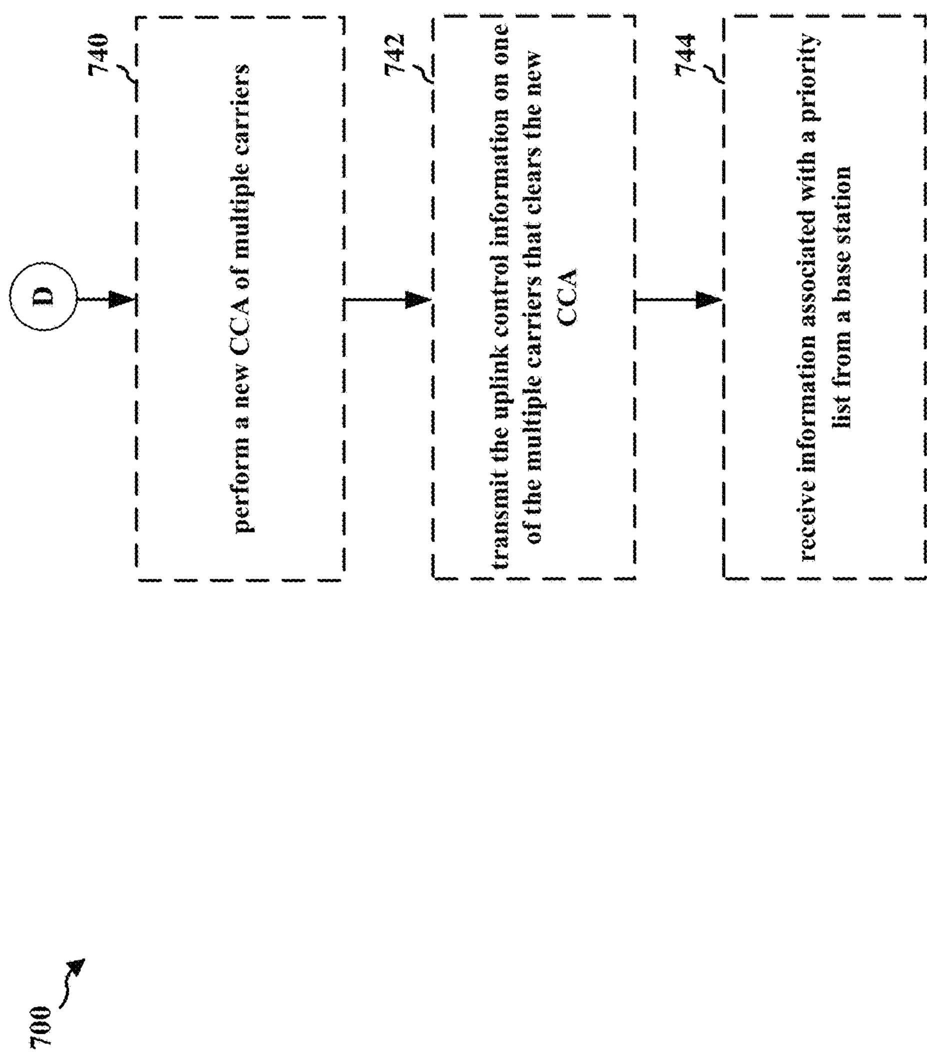

However, if the UE determines the CCA fails at 706, at 710, the UE may perform transmission procedure A (see FIG. 7B), transmission procedure B (see FIG. 7C), transmission procedure C (see FIG. 7D), or transmission procedure D (see FIG. 7E).

Transmission Procedure A

As shown in FIG. 7B, at 712, the UE may transmit the uplink control information in a later subframe of the uplink burst. For example, referring to FIG. 4, If the CCA of the original unlicensed carrier fails, the UE 406 may transmit 410 the PUCCH transmission on the original unlicensed carrier in a later subframe of the uplink burst.

At 714, the UE may determine the PUCCH resources reserved in the later subframe of the uplink burst or the later uplink burst based on signaling received from a base station. For example, referring to FIG. 4, if the eNB 404 has reserved PUCCH resources in a later subframe of the uplink burst or in a later uplink burst on the original unlicensed carrier, the UE 406 may determine 408 the reserved PUCCH resources based on the signaling 412 received from the eNB 404. For example, the signaling 412 may include RRC signaling or DCI signaling. Alternatively, the UE may infer the location of the next PUCCH subframe of a later uplink burst based on the PFFICH.

At 716, the UE may attempt CCA of the carrier before the uplink control information is transmitted on the carrier in the later subframe of the uplink burst or in the later uplink burst. For example, referring to FIG. 4, if the eNB 404 has reserved PUCCH resources in a later subframe of the uplink burst or a later uplink burst on the original unlicensed carrier, the UE 406 may determine 408 the reserved PUCCH resources based on the signaling 412 received from the eNB 404 and attempt to send the PUCCH transmission in the later subframe of the uplink burst or the later uplink burst.

At 718, the UE may update a payload of the PUCCH transmission prior to transmission in the later subframe of the uplink burst or in the later uplink burst. For example, referring to FIG. 4, if necessary, the UE 406 may update 408 the payload of the PUCCH transmission before being sent on the unlicensed carrier in the later subframe of the uplink burst or the later uplink burst.

At 720, the UE may determine if a number of RBs in a PUSCH of a licensed carrier exceeds a threshold value. For example, the UE 406 may determine 408 if a number of RBs in a PUSCH of the licensed carrier exceeds a threshold number, and if the threshold number of RBs is exceeded, the UE 406 may multiplex 408 the PUCCH transmission with a licensed carrier PUSCH transmission. Otherwise, if the threshold number of RBs is not exceeded, the UE 406 may multiplex 408 the PUCCH transmission with a PUCCH transmission of the licensed carrier.

At 722, the UE may multiplex the uplink control information with a licensed carrier PUSCH transmission when the number of RBs exceeds the threshold value. For example, referring to FIG. 4, if the threshold number of RBs is exceeded, the UE 406 may multiplex 408 the PUCCH transmission with a licensed carrier PUSCH transmission.

At 724, the UE may multiplex the uplink control information with a licensed carrier PUCCH transmission when the number of RBs does not exceed the threshold value. For example, referring to FIG. 4, if the threshold number of RBs is not exceeded, the UE 406 may multiplex 408 the PUCCH transmission with a PUCCH transmission of the licensed carrier.

At 726, the UE may reduce a payload of the uplink control information when the PUCCH transmission is transmitted on the licensed carrier. For example, referring to FIG. 4, when the ePUCCH transmission is sent on a licensed carrier, the UE 406 may reduce 408 a payload of the ePUCCH transmission. For example, the UE 406 may reduce 408 the payload of the ePUCCH transmission on the licensed carrier by 1) reporting only ACK/NACK but dropping the CQI in the ePUCCH transmission on the licensed carrier, 2) reporting wideband CQI but dropping sub-band specific CQI in the ePUCCH transmission on the licensed carrier, 3) dropping bursty interference indication, or 4) bundling some ACK/NACK bits and wideband CQI in the ePUCCH transmission on the licensed carrier. In an aspect, how the UE 406 reduces 408 the payload of the ePUCCH transmission on the licensed carrier may depend on configuration by the eNB 404.

Transmission Procedure B

As shown in FIG. 7C, at 728, the UE may transmit the uplink control information on a different uplink burst. For example, referring to FIG. 4, if the CCA of the original unlicensed carrier fails, the UE 406 may transmit 410 the PUCCH transmission on the original unlicensed carrier in a different uplink burst.

At 730, the UE may determine if a number of failures of the CCA reaches a threshold. For example, referring to FIG. 4, the UE 406 may determine 408 if a number of failures of the CCA check of the original unlicensed carrier reaches a threshold value, and if the threshold value is reached, the PUCCH transmission may be sent 410 on one of the different carriers (e.g., a licensed carrier).

At 732, the UE may transmit the PUCCH transmission on the different carrier when the threshold is reached. For example, referring to FIG. 4, the UE 406 may determine 408 if a number of failures of the CCA check of the original unlicensed carrier reaches a threshold value, and if the threshold value is reached, the PUCCH transmission may be sent 410 on one of the different carriers (e.g., the licensed carrier).

Transmission Procedure C

As shown in FIG. 7D, at 734, the UE may transmit the PUCCH uplink control information on a different carrier. For example, referring to FIG. 4, if the CCA of the original unlicensed carrier fails, the UE 406 may transmit 410 the PUCCH transmission on a different unlicensed carrier and/or a licensed carrier.

At 736, the UE may determine if a number of failures of the CCA reaches a threshold. For example, referring to FIG. 4, the UE 406 may determine 408 if a number of failures of the CCA check of the original unlicensed carrier reaches a threshold value, and if the threshold value is reached, the PUCCH transmission may be sent 410 on one of the different carriers (e.g., a licensed carrier).

At 738, the UE may transmit the PUCCH transmission on the different carrier when the threshold is reached. For example, referring to FIG. 4, the UE 406 may determine 408 if a number of failures of the CCA check of the original unlicensed carrier reaches a threshold value, and if the threshold value is reached, the PUCCH transmission may be sent 410 on one of the different carriers (e.g., the licensed carrier).

Transmission Procedure D

As shown in FIG. 7E, at 740, the UE may perform a new CCA of multiple carriers. For example, referring to FIG. 4, the UE 406 may perform 408 a new CCA check of each of the one or more different carriers, and if one of the new CCA checks clears, the PUCCH transmission may be dynamically sent 410 on the different carrier in the same or a different uplink burst as in the original unlicensed carrier. In an aspect, if two or more of the new CCA checks clear, for example, then the different carrier selected for the PUCCH transmission may be chosen based on a priority list of the one or more different carriers. For example, the priority list may be transmitted by the signaling 412 from the eNB 404.

At 742, the UE may transmit the PUCCH transmission on one of the multiple carriers that clears the new CCA. For example, referring to FIG. 4, if one of the new CCA checks clears, the PUCCH transmission may be dynamically sent 410 on the different carrier in the same or a different uplink burst as in the original unlicensed carrier. In an aspect, if two or more of the new CCA checks clear, for example, then the different carrier selected for the PUCCH transmission may be chosen based on a priority list of the one or more different carriers. For example, the priority list may be transmitted by the signaling 412 from the eNB 404. In addition, the different carriers in the priority list may each be associated with a specific cell index.

At 744, the UE may receive information associated with a priority list from a base station. For example, referring to FIG. 4, if two or more of the new CCA checks clear, for example, then the different carrier selected for the PUCCH transmission may be chosen based on a priority list of the one or more different carriers. For example, the priority list may be transmitted by the signaling 412 from the eNB 404. In addition, the different carriers in the priority list may each be associated with a specific cell index. In an aspect, a same set of resources may be reserved on each of the multiple carriers for the PUCCH transmission. In a further aspect, a different set of resources are reserved on each of the multiple carriers for the PUCCH transmission. Still further, the PUCCH transmission may be multiplexed with a PUSCH transmission on the different carrier.

Figure 8:
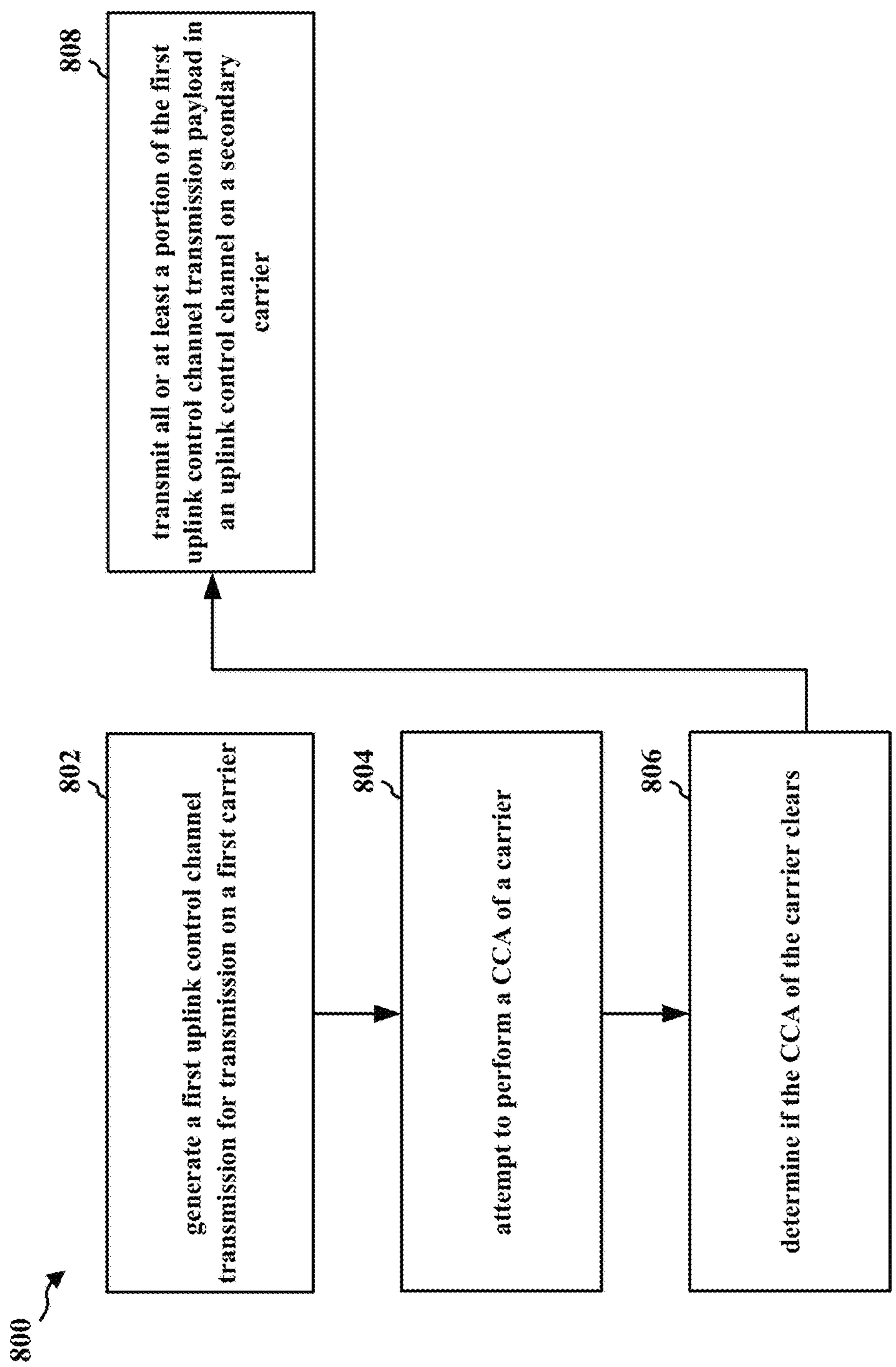
FIG. 8 is a flowchart of an example method of wireless communication.

FIG. 8 is a flowchart 800 of a method of wireless communication. The method may be performed by a UE (e.g., the UE 406, the apparatus 902/902'). Operations indicated with dashed lines represent optional operations for various aspects of the disclosure.

At 802, the UE may generate a first uplink control channel transmission for transmission on a first carrier. For example, referring to FIG. 4, the UE 406 may generate 408 a PUCCH transmission to be sent on the original unlicensed carrier during an uplink burst to eNB 404. In an aspect, the first uplink control channel is one of a PUCCH or an ePUCCH. In aspect, the ePUCCH is the PUCCH or a modified PUCCH on the unlicensed spectrum.

At 804, the UE may attempt to perform a CCA of a carrier. For example, referring to FIG. 4, the UE 406 may attempt 408 to perform a CCA of the unlicensed carrier.

At 806, the UE may determine if the CCA of the carrier clears. For example, referring to FIG. 4, the UE 406 may determine 408 if the CCA of the original unlicensed carrier fails or clears.

At 808, the UE may transmit all or at least a portion of a payload of the first uplink control channel transmission in an uplink control channel on a second carrier. in an aspect, wherein when at least the portion of the payload of the first uplink control transmission is transmitted on the second carrier a second uplink control transmission is transmitted on the first carrier. For example, referring to FIG. 4, if an attempt 408 to perform a CCA check of the original unlicensed carrier is successful, and the UE 406 determines the CCA of the original unlicensed carrier clears, the UE 406 may still have to transmit 410, 414 all or at least a portion of the payload PUCCH transmission in an uplink control channel on a different carrier, such as a licensed carrier. To reduce the payload of the ePUCCH transmitted on the licensed carrier, the UE 406 may transmit a portion of the ePUCCH on the unlicensed carrier as well as the licensed carrier. An ACK/NACK payload on PUCCH on the licensed carrier may be multiplexed/bundled, and an ACK/NACK payload transmitted on ePUCCH/ePUSCH of an unlicensed carrier, individual bits may be transmitted without multiplexing/bundling. In an example, a first portion of the payload of the PUCCH transmission may be transmitted 410 on the original unlicensed carrier and a second portion of the PUCCH transmission may be transmitted 410 on the licensed carrier. In an aspect, a larger payload of the PUCCH transmission may be sent on the original unlicensed carrier (e.g. subband CQI) and a smaller payload of PUCCH transmission may be sent on the licensed carrier (e.g., wideband CQI or ACK/NACK). In an aspect, the transmitting at least a portion of the PUCCH payload in an uplink control channel on the second carrier comprises transmitting a small payload from the PUCCH transmission on the first carrier and transmitting a larger payload of the PUCCH transmission on the second carrier. In a further aspect, the larger payload is a CQI. In still a further aspect, the small payload is a wideband CQI and the larger payload is a sub-band CQI. In still a further aspect, the small payload may comprise a compressed or multiplexed ACK/NACK while the larger payload comprises a uncompressed or unmultiplexed ACK/NACK. Moreover, an uncompressed or unmultiplexed ACK/NACK may be transmitted on the first carrier if some of the payload of the first uplink control channel transmission is moved to the PUCCH on the second carrier.

Figure 9:
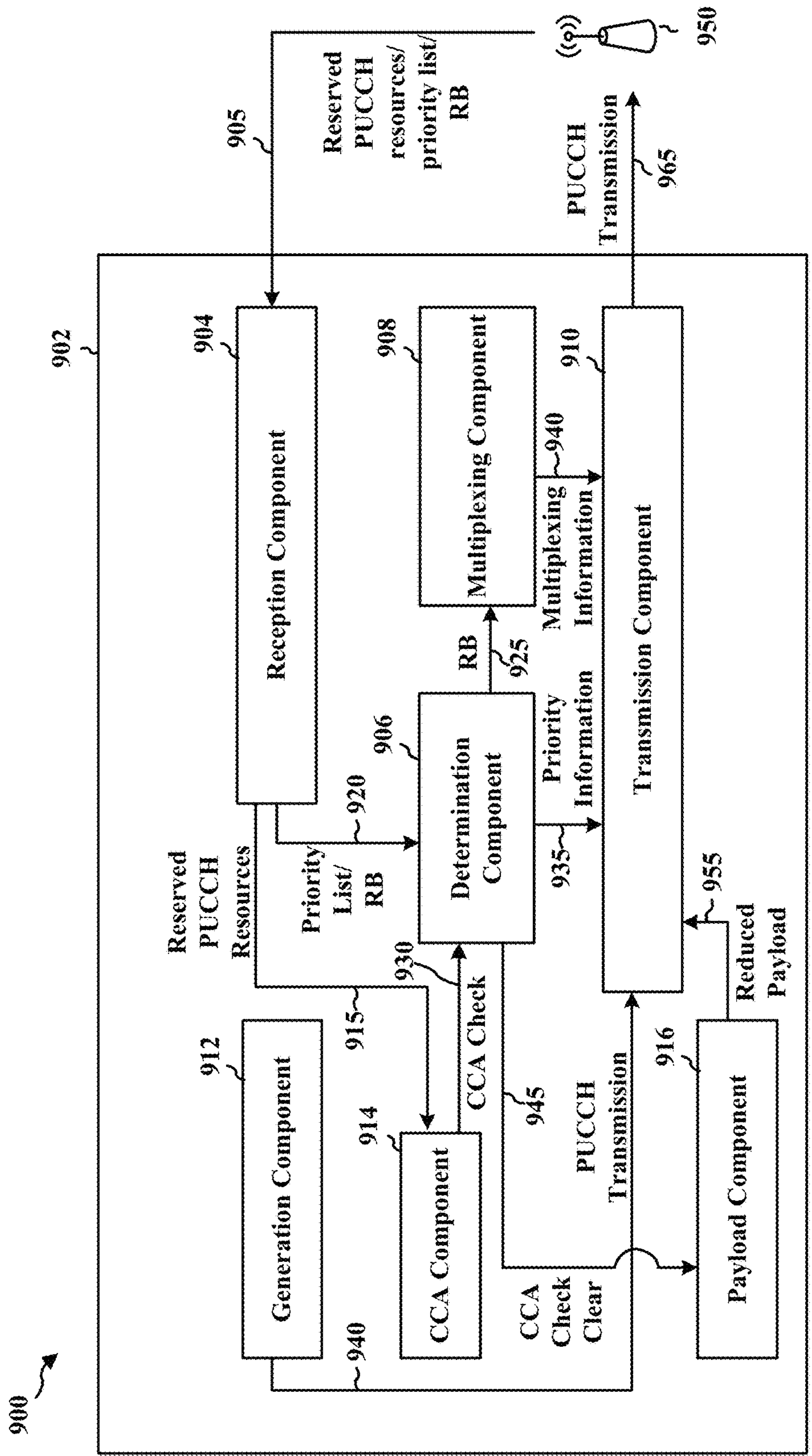
FIG. 9 is a conceptual data flow diagram illustrating the data flow between different means/components in an example apparatus.

FIG. 9 is a conceptual data flow diagram 900 illustrating the data flow between different means/components in an example apparatus 902. The apparatus may be a UE. The apparatus includes a reception component 904, a determination component 906, a multiplexing component 908, a transmission component 910, a generation component 912, a CCA component 914, and a payload component 916.

At reception component 904, the UE receives signaling 905 related to reserved PUCCH resources, a priority list of different carriers, and/or the number of RBs in a PUSCH of a licensed carrier from eNB 950. For example, the signaling 905 may include RRC signaling or DCI signaling.

At generation component 912, the UE generates a PUCCH transmission, and sends a signal 940 associated with the PUCCH transmission to the transmission component 910. At transmission component 910, the UE transmits the PUCCH transmission 965 to the eNB 950.

At CCA component 914, the UE receives a signal 905 related to the reserved PUCCH resources from reception component 904. At CCA component 914, the UE attempts to perform a CCA of a carrier for an uplink burst. For example, the UE attempts to perform a CCA of an unlicensed carrier. A signal 930 associated with the CCA attempt is sent from the CCA component 914 to the determination component 906.

At the determination component 906, the UE determines if the CCA attempt of the unlicensed carrier clears or fails. For example, if the CCA of the original unlicensed carrier fails, the UE may perform one of the following: 1) transmit the PUCCH transmission on the original unlicensed carrier in a later subframe of the uplink burst using transmission component 910, 2) transmit the PUCCH transmission on the original unlicensed carrier in a different uplink burst using transmission component 910, 3) transmit the PUCCH transmission on a different unlicensed carrier and/or a licensed carrier using transmission component 910, 4) multiplexing the PUCCH transmission with the current/next/later PUCCH instance on the licensed carrier using multiplexing component 908, 5) multiplexing the PUCCH transmission with the PUSCH on the licensed carrier using multiplexing component 908, or 6) split/compress the payload of the PUCCH to be transmitted across the licensed carrier and the original or different unlicensed carrier using payload component 916.

In addition, at payload component 916, the UE may update a payload of the PUCCH transmission prior to transmission by the transmission component 910 in the later subframe of the uplink burst, in the later uplink burst, or in the different carrier.

Furthermore, at the CCA component 914, a signal 915 is received from the reception component 904 related to PUCCH resources reserved in the later subframe of the uplink burst of the unlicensed carrier, the later uplink burst of the unlicensed carrier, and/or one or more different carriers. The CCA component 914 may perform a CCA check prior to transmission of PUCCH transmission in the later subframe of the uplink burst on the unlicensed carrier, the later uplink burst on the unlicensed carrier, and/or the different carrier. For example, the UE may perform a new CCA check of each of the one or more different carriers at the CCA component 914. The CCA component 914 may send a signal 930 associated with the CCA check to the determination component 906. If one of the new CCA checks clears at the determination component 906, the PUCCH transmission may be dynamically sent on the different carrier in the same or a different uplink burst as in the original unlicensed carrier by the transmission component 910. In an aspect, if two or more of the new CCA checks clear at the determination component 906, for example, then the different carrier selected for the PUCCH transmission may be chosen by the determination component 906 based on a priority list of the one or more different carriers. For example, signaling 905 related to a priority list may be received at the reception component 904 from the eNB 950, and a signal 920 related to the priority list may be sent from the reception component 904 to the determination component 906 which determines priority information of the different carriers when more than one CCA check clears. The determination component 906 may send a signal 935 associated with the priority information to the transmission component 910. The UE may transmit, at the transmission component 910, the PUCCH transmission based on the priority information.

At the determination component 906, the UE may determine if a number of failures of the CCA check of the original unlicensed carrier reaches a threshold value, and if the threshold value is reached, the PUCCH transmission may be sent on one of the different carriers, such as a licensed carrier, by transmission component 910.

Furthermore, a signal 920 related to the number of RBs in a PUSCH of the unlicensed carrier may be received at the determination component 906 from the reception component 904. At the determination component 906, UE may determine if a number of RBs in a PUSCH of the licensed carrier exceeds a threshold number. A signal 925 associated with the RB threshold determination may be sent from the determination component 906 to the multiplexing component 908. If the threshold number of RBs is exceeded, the UE may multiplex, at the multiplexing component 908, the PUCCH transmission with a licensed carrier PUSCH transmission. Otherwise, if the threshold number of RBs is not exceeded, the UE may multiplex, at the multiplexing component 908, the PUCCH transmission with a PUCCH transmission of the licensed carrier. The multiplexing component 908 may send a signal 940 to the transmission component 910 related to multiplexing information associated with how the PUCCH transmission is to be multiplexed.

At the payload component 916, the UE may reduce the payload of the PUCCH transmission on the licensed carrier by 1) reporting only ACK/NACK but dropping the CQI in the ePUCCH transmission on the licensed carrier, 2) reporting wideband CQI but dropping sub-band specific CQI in the ePUCCH transmission on the licensed carrier, 3) dropping bursty interference indication, or 4) bundling some ACK/NACK bits and wideband CQI in the ePUCCH transmission on the licensed carrier.

At the determination component 906, if the UE determines that the CCA check of the unlicensed carrier clears, and that the PUCCH transmission is to be sent on the unlicensed carrier and a licensed carrier, a signal 945 related to the CCA check clearance may be sent to the payload component 916. A signal 955 related to the reduced payload may be sent to the transmission component 910, and the UE, at the transmission component 910, may transmit all or at least a portion of a payload of the first uplink control channel transmission in an uplink control channel on a second carrier. To reduce the payload of the PUCCH transmitted on the licensed carrier, the UE may transmit a portion of the PUCCH on the unlicensed carrier as well as the licensed carrier at the transmission component 910. An ACK/NACK payload on PUCCH on the licensed carrier may be multiplexed/bundled at the multiplexing component 908, and an ACK/NACK payload transmitted on ePUCCH/ePUSCH of an unlicensed carrier by the transmission component 910, individual bits may be transmitted without multiplexing/bundling. In an example, a first portion of the payload of the PUCCH transmission may be transmitted on the original unlicensed carrier and a second portion of the PUCCH transmission may be transmitted on the licensed carrier by the transmission component 910. In an aspect, a larger payload of the PUCCH transmission may be sent on the original licensed carrier (e.g., wideband CQI) and a smaller payload of PUCCH transmission may be sent on the licensed carrier. In an aspect, the transmitting at least a portion of the PUCCH payload in an uplink control channel on the second carrier comprises transmitting a small payload from the PUCCH transmission on the first carrier and transmitting a larger payload of the PUCCH transmission on the second carrier by the transmission component 910. In a further aspect, the larger payload is a CQI. In still a further aspect, the small payload is a wideband CQI and the larger payload is a sub-band CQI. In still a further aspect, an uncompressed or unmultiplexed ACK/NACK may be transmitted by the transmission component 910 on the first carrier if some of the payload of the first uplink control channel transmission is moved to the PUCCH on the second carrier.

The apparatus may include additional components that perform each of the blocks of the algorithm in the aforementioned flowcharts of FIGS. 7A-7E and 8. As such, each block in the aforementioned flowcharts of FIGS. 7A-7E and 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 10:
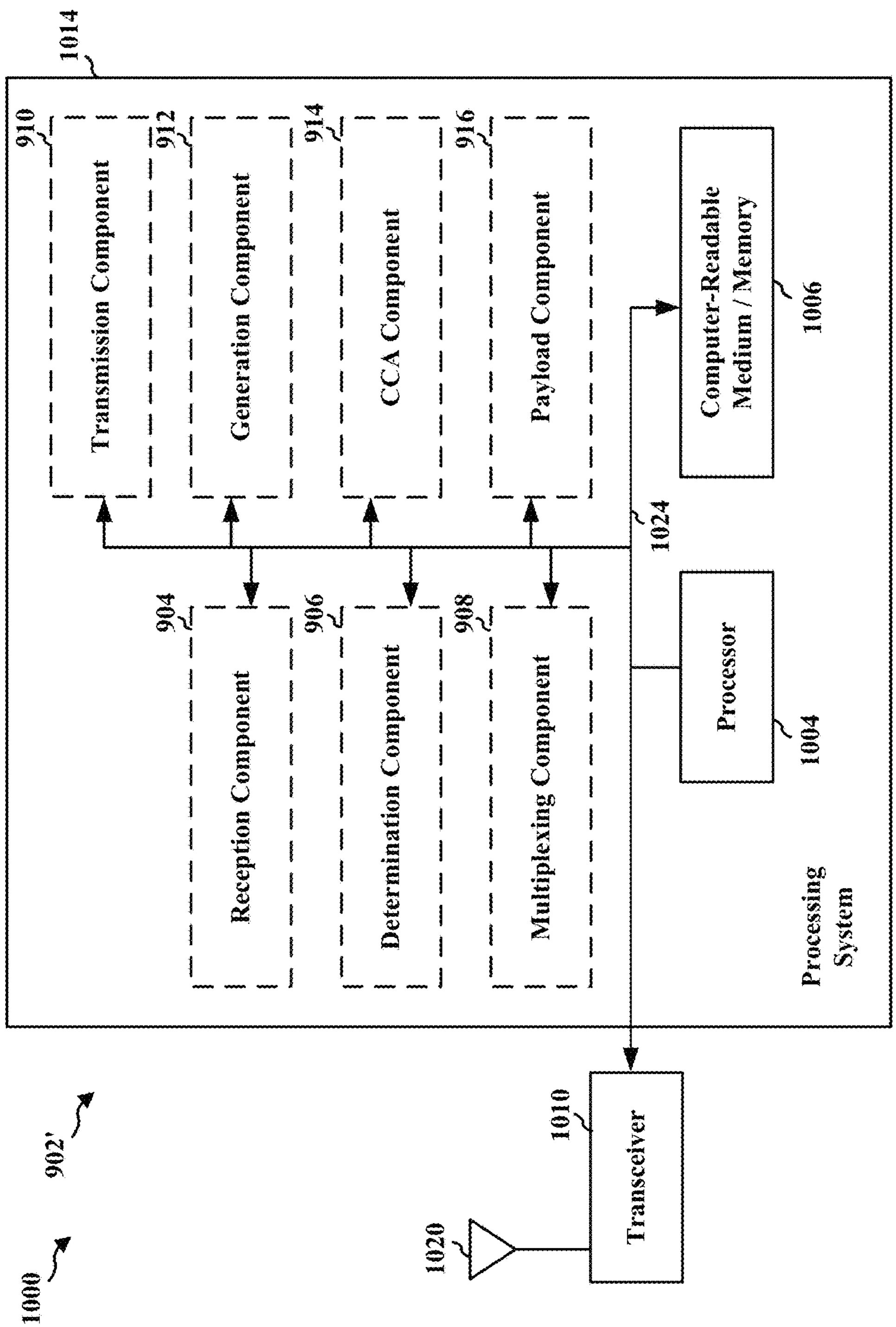
FIG. 10 is a diagram illustrating an example of a hardware implementation for an apparatus employing a processing system.

FIG. 10 is a diagram 1000 illustrating an example of a hardware implementation for an apparatus 902' employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware components, represented by the processor 1004, the components 904, 906, 908, 910, 912, 914, 916, and the computer-readable medium/memory 1006. The bus 1024 may also link various other circuits such as timing sources, peripherals, voltage regulators, and power management circuits, which are well known in the art, and therefore, will not be described any further.

The processing system 1014 may be coupled to a transceiver 1010. The transceiver 1010 is coupled to one or more antennas 1020. The transceiver 1010 provides a means for communicating with various other apparatus over a transmission medium. The transceiver 1010 receives a signal from the one or more antennas 1020, extracts information from the received signal, and provides the extracted information to the processing system 1014, specifically the reception component 904. In addition, the transceiver 1010 receives information from the processing system 1014, specifically the transmission component 910, and based on the received information, generates a signal to be applied to the one or more antennas 1020. The processing system 1014 includes a processor 1004 coupled to a computer-readable medium/memory 1006. The processor 1004 is responsible for general processing, including the execution of software stored on the computer-readable medium/memory 1006. The software, when executed by the processor 1004, causes the processing system 1014 to perform the various functions described supra for any particular apparatus. The computer-readable medium/memory 1006 may also be used for storing data that is manipulated by the processor 1004 when executing software. The processing system 1014 further includes at least one of the components 904, 906, 908, 910, 912, 914, 916. The components may be software components running in the processor 1004, resident/stored in the computer readable medium/memory 1006, one or more hardware components coupled to the processor 1004, or some combination thereof. The processing system 1014 may be a component of the UE 350 and may include the memory 360 and/or at least one of the TX processor 368, the RX processor 356, and the controller/processor 359.

In one configuration, the apparatus 902/902' for wireless communication includes means for generating a PUCCH transmission. In a further aspect, the apparatus 902/902' for wireless communications includes means for attempting to perform CCA of a carrier for an uplink burst. In an aspect, the wireless communication further includes means for determining a failure of the CCA. In another aspect, the apparatus 902/902' for wireless communications includes means for performing one of the following when it is determined that the CCA has failed: transmitting the PUCCH transmission on the carrier in a later subframe of the uplink burst, transmitting the PUCCH transmission on the carrier in a different uplink burst, or transmitting the PUCCH transmission on a different carrier. In an aspect, PUCCH resources are reserved in the later subframe of the uplink burst for the PUCCH transmission. In still a further aspect, the apparatus 902/902' for wireless communications includes means for determining the PUCCH resources reserved in the later subframe of the uplink burst based on signaling received from a base station. Furthermore, in an aspect, the apparatus 902/902' for wireless communications includes means for attempting to perform another CCA of the carrier before PUCCH transmission is transmitted on the carrier in the later subframe of the uplink burst. In an aspect, the PUCCH transmission includes CRC bits. In another aspect, the apparatus 902/902' for wireless communications includes means for updating a payload of the PUCCH transmission before the PUCCH transmission is transmitted on the carrier in the later subframe of the uplink burst. In an aspect, the PUCCH resources are reserved in the different uplink burst of the carrier for the PUCCH transmission. In an aspect, the apparatus 902/902' for wireless communications further includes means for determining the PUCCH resources reserved in the later uplink burst based on signaling received from a base station. In an aspect, the apparatus 902/902' for wireless communications also includes means for attempting to perform another CCA of the carrier before the PUCCH transmission is transmitted on the carrier in the later uplink burst. Moreover, in an aspect, the apparatus 902/902' for wireless communications includes means for updating a payload of the PUCCH transmission before the PUCCH transmission is transmitted on the carrier in the later uplink burst. In an aspect, the PUCCH transmission is transmitted on the different carrier in a same subframe as the uplink burst or a different subframe than the uplink burst. In an aspect, the PUCCH resources are reserved on the different carrier for the PUCCH transmission. In another aspect, the apparatus 902/902' for wireless communications includes means for performing a new CCA of multiple carriers. In a further aspect, the apparatus 902/902' for wireless communications includes means for transmitting the PUCCH transmission on one of the multiple carriers that clears the new CCA. In an aspect, the PUCCH transmission is transmitted on the one of the multiple carriers based on a priority list if two or more of the multiple carriers clears the new CCA. In still another aspect, the apparatus 902/902' for wireless communications includes means for receiving information associated with the priority list from a base station. In an aspect, a same set of resources are reserved on each of the multiple carriers for the PUCCH transmission. In an aspect, a different set of resources are reserved on each of the multiple carriers for the PUCCH transmission. In an aspect, the PUCCH transmission is multiplexed with a PUSCH transmission on the different carrier. In a further aspect, the apparatus 902/902' for wireless communications includes means for determining a number of failures of the CCA reaches a threshold. In another aspect, the apparatus 902/902' for wireless communications includes means for transmitting the PUCCH transmission on the different carrier when the threshold is reached. In an aspect, the carrier is an unlicensed carrier and the different carrier is a licensed carrier. In an aspect, the means for transmitting the PUCCH on the licensed carrier is configured to: determine if a number of RBs in a PUSCH of the licensed carrier exceeds a threshold value, multiplex the PUCCH transmission with a licensed carrier PUSCH transmission when the number of RBs exceeds the threshold value, and multiplex the PUCCH transmission with a licensed carrier PUCCH transmission when the number of RBs does not exceed the threshold value. In another aspect, the apparatus 902/902' for wireless communications includes means for reducing a payload of the PUCCH transmission when the PUCCH transmission is transmitted on the licensed carrier. In an aspect, the payload of the PUCCH transmission is reduced by not including or multiplexing one or more of ACK/NACK bits, CQI, wideband CQI, subband specific CQI, or interference information. Further, in an aspect, the apparatus 902/902' for wireless communications includes means for generating a first uplink control channel transmission for transmission on a first carrier. In a further aspect, the apparatus 902/902' for wireless communications includes means for attempting to perform a CCA of a carrier. In still a further aspect, the apparatus 902/902' for wireless communications includes means for determining the CCA of the carrier clears. Still further, in an aspect, the apparatus 902/902' for wireless communications includes means for transmitting all or at least a portion of a payload of the first uplink control channel transmission in an uplink control channel on a second carrier. In an aspect, when a portion of the first uplink control transmission is transmitted on the second carrier and a second uplink control transmission is transmitted on the first carrier. In an aspect, the first uplink control channel is a PUCCH and the second uplink control channel is an ePUCCH. In an aspect, the means for transmitting at least a portion of the PUCCH payload in an uplink control channel on the second carrier comprises transmitting a small payload from the PUCCH transmission on the first carrier and transmitting a larger payload of the PUCCH transmission on the second carrier. In an aspect, the larger payload is a CQI. In an aspect, the small payload is a wideband CQI and the larger payload is a sub-band CQI. In a further aspect, an uncompressed or unmultiplexed ACK/NACK may be transmitted on the first carrier if some of the payload of the first uplink control channel transmission is moved to the PUCCH on the second carrier. The aforementioned means may be one or more of the aforementioned components of the apparatus 902 and/or the processing system 1014 of the apparatus 902' configured to perform the functions recited by the aforementioned means. As described supra, the processing system 1014 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a User Equipment (UE), comprising:
- generating uplink control information;
- attempting to perform a clear channel assessment (CCA) of an unlicensed carrier for an uplink burst;
- transmitting the uplink control information on the unlicensed carrier when the CCA is successful; and
- performing one of the following when the UE determines that the UE's attempt to perform CCA has failed:
  - transmitting the uplink control information on the unlicensed carrier in a later subframe of the uplink burst;
  - transmitting the uplink control information on the unlicensed carrier in a different uplink burst; or
  - transmitting the uplink control information on a different carrier.

2. The method of claim 1, wherein physical uplink control channel (PUCCH) resources are reserved in the later subframe of the uplink burst for the uplink control information.

3. The method of claim 2, further comprising determining the PUCCH resources reserved in the later subframe of the uplink burst based on signaling received from a base station.

4. The method of claim 1, wherein physical uplink control channel (PUCCH) resources are reserved in the different uplink burst of the unlicensed carrier for the uplink control information.

5. The method of claim 4, further comprising determining the PUCCH resources reserved in the different uplink burst based on signaling received from a base station.

6. The method of claim 1, further comprising attempting to perform another type of CCA of the unlicensed carrier before the uplink control information is transmitted on the unlicensed carrier in the different uplink burst.

7. The method of claim 1, wherein the uplink control information is transmitted on the different carrier in a same subframe as the uplink burst or a different subframe than the uplink burst.

8. The method of claim 7, wherein the uplink control information is multiplexed with a physical uplink shared channel (PUSCH) transmission on at least one of the different carrier or a different subframe.

9. The method of claim 1, wherein physical uplink control channel (PUCCH) resources are reserved on the different carrier for the uplink control information.

10. The method of claim 1, further comprising:
- performing a new CCA of multiple carriers; and
- transmitting the uplink control information on one or more of the multiple carriers that clears the new CCA.

11. The method of claim 10, wherein uplink control information is transmitted on the one of the multiple carriers based on a priority list if two or more of the multiple carriers clears the new CCA.

12. The method of claim 11, further comprising receiving information associated with the priority list from a base station.

13. The method of claim 1, further comprising:
- determining a number of failures of the CCA reaches a threshold; and
- transmitting the uplink control information on the different carrier when the threshold is reached.

14. The method of claim 1, wherein the different carrier is a licensed carrier.

15. The method of claim 14, wherein the transmitting the uplink control information on the licensed carrier comprises:
- determining if a number of resource blocks (RBs) in a physical uplink shared channel (PUSCH) of the licensed carrier exceeds a threshold value;
- multiplexing the uplink control information with a licensed carrier PUSCH transmission when the number of RBs exceeds the threshold value; and
- multiplexing the uplink control information with a licensed carrier uplink control information when the number of RBs does not exceed the threshold value.

16. The method of claim 15, further comprising reducing a payload of the uplink control information when the uplink control information is transmitted on the licensed carrier.

17. The method of claim 1, wherein if it is determined that the CCA has failed, the uplink control information is transmitted on the unlicensed carrier in a later subframe of the uplink burst.

18. The method of claim 1, wherein if it is determined that the CCA has failed, the uplink control information is transmitted on the unlicensed carrier in a different uplink burst.

19. An apparatus for wireless communication at a User Equipment (UE), comprising:
- a memory; and
- at least one processor coupled to the memory and configured to:
  - generate uplink control information;
  - attempt to perform a clear channel assessment (CCA) of an unlicensed carrier for an uplink burst;
  - transmit the uplink control information on the unlicensed carrier when the CCA is successful; and
  - perform one of the following when the UE determines that the UE's attempt to perform CCA has failed:
    - transmit the uplink control information on the unlicensed carrier in a later subframe of the uplink burst;
    - transmit the uplink control information on the unlicensed carrier in a different uplink burst; or
    - transmit the uplink control information on a different carrier.

20. The apparatus of claim 19, wherein physical uplink control channel (PUCCH) resources are reserved in the later subframe of the uplink burst for the uplink control information.

21. The apparatus of claim 20, wherein the at least one processor is further configured to determine the PUCCH resources reserved in the later subframe of the uplink burst based on signaling received from a base station.

22. The apparatus of claim 19, wherein physical uplink control channel (PUCCH) resources are reserved in the different uplink burst of the unlicensed carrier for the uplink control information.

23. The apparatus of claim 22, wherein the at least one processor is further configured to determine the PUCCH resources reserved in the different uplink burst based on signaling received from a base station.

24. The apparatus of claim 19, wherein the at least one processor is further configured to attempt to perform another type of CCA of the unlicensed carrier before the uplink control information is transmitted on the unlicensed carrier in the different uplink burst.

25. The apparatus of claim 19, wherein the uplink control information is transmitted on the different carrier in a same subframe as the uplink burst or a different subframe than the uplink burst.

26. The apparatus of claim 25, wherein the uplink control information is multiplexed with a physical uplink shared channel (PUSCH) transmission on at least one of the different carrier or a different subframe.

27. The apparatus of claim 19, wherein the at least one processor is further configured to:
- perform a new CCA of multiple carriers; and
- transmit the uplink control information on one or more of the multiple carriers that clears the new CCA,
- wherein the uplink control information is transmitted on the one of the multiple carriers based on a priority list if two or more of the multiple carriers clears the new CCA.

28. The apparatus of claim 27, wherein the at least one processor is further configured to receive information associated with the priority list from a base station.

29. The apparatus of claim 19, wherein the at least one processor is further configured to:
- determine a number of failures of the CCA reaches a threshold; and
- transmit the uplink control information on the different carrier when the threshold is reached.

30. The apparatus of claim 19, wherein the different carrier is a licensed carrier, and wherein the at least one processor is configured to transmit the uplink control information on the licensed carrier by:
- determining if a number of resource blocks (RBs) in a physical uplink shared channel (PUSCH) of the licensed carrier exceeds a threshold value;
- multiplexing the uplink control information with a licensed carrier PUSCH transmission when the number of RBs exceeds the threshold value;
- multiplexing the uplink control information with a licensed carrier uplink control information when the number of RBs does not exceed the threshold value; and
- reducing a payload of the uplink control information when the uplink control information is transmitted on the licensed carrier.

31. An apparatus for wireless communication at a User Equipment (UE), comprising:

means for generating uplink control information;

means for attempting to perform a clear channel assessment (CCA) of an unlicensed carrier for an uplink burst;

means for transmitting the uplink control information on the unlicensed carrier when the CCA is successful; and means for performing one of the following when the UE determines that the UE's attempt to perform CCA has failed:

transmitting the uplink control information on the unlicensed carrier in a later subframe of the uplink burst;

transmitting the uplink control information on the unlicensed carrier in a different uplink burst; or transmitting the uplink control information on a different carrier.

32. A non-transitory computer-readable medium storing computer executable code for wireless communication at a User Equipment (UE), comprising code to:

generate uplink control information;

attempt to perform a clear channel assessment (CCA) of an unlicensed carrier for an uplink burst;

transmit the uplink control information on the unlicensed carrier when the CCA is successful; and perform one of the following when the UE determines that the UE's attempt to perform CCA has failed:

transmit the uplink control information on the unlicensed carrier in a later subframe of the uplink burst;

transmit the uplink control information on the unlicensed carrier in a different uplink burst; or transmit the uplink control information on a different carrier.

* * * * *